(12) United States Patent
Tiemann et al.

(10) Patent No.: US 7,986,397 B1
(45) Date of Patent: Jul. 26, 2011

(54) FMCW 3-D LADAR IMAGING SYSTEMS AND METHODS WITH REDUCED DOPPLER SENSITIVITY

(75) Inventors: Bruce G. Tiemann, Longmont, CO (US); Brian Krause, Erie, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 501 days.

(21) Appl. No.: 12/113,126

(22) Filed: Apr. 30, 2008

(51) Int. Cl.
  *G01C 3/08* (2006.01)
(52) U.S. Cl. ...................................................... 356/5.09
(58) Field of Classification Search ......... 356/3.01–28.5
  See application file for complete search history.

(56) References Cited

U.S. PATENT DOCUMENTS

| 7,280,186 B1 * | 10/2007 | Ionov ........................... 356/5.15 |
| 2007/0171367 A1 * | 7/2007 | Sebastian et al. ............. 351/206 |

OTHER PUBLICATIONS

SU320MSW-1.7RT Indium Gallium Arsenide Snapshot MiniCamera with Windowing Operation Manual, Doc. No. 4110-0046 Rev. C, Aug. 13, 2004, p. 30.

Van Trees, Harry L., "Detection, Estimation, and Modulation Theory: Part III Radar-Sonar Signal Processing and Gaussian Signals in Noise," p. 299, John Wiley & Sons, New York, 1971.
Jaquez, John A., et al., "Spectral Reflectance of Human Skin in the Region 0.7-2.6 µ," J. Appl. Physiol., Nov. 1955; 8: 297-299.
Deley, Gary W., "Radar Handbook", Ch. 3, pp. 3-11, McGraw Hill, 1970.

* cited by examiner

*Primary Examiner* — Thomas H Tarcza
*Assistant Examiner* — Luke D Ratcliffe
(74) *Attorney, Agent, or Firm* — McDermott Will & Emery LLP

(57) ABSTRACT

A method for frequency modulated continuous wave LADAR imaging is provided. The method comprises the steps of generating a chirped laser signal and a constant-frequency laser signal, forming a target laser signal from the chirped laser signal and the constant-frequency laser signal and forming a local oscillator laser signal from the chirped laser signal and the constant-frequency laser signal. The method further comprises delaying or frequency shifting the local oscillator laser signal and directing the target laser signal to a target. The method further comprises combining a returned signal received from the target with the delayed or frequency shifted local oscillator laser signal to form a combined received signal, and capturing the combined received signal with a plurality of image sensors. The method further comprises performing a nonlinear operation on the captured combined received signal and Fourier transforming the captured combined received signal to determine a range corresponding to each of the plurality of image sensors in the imaging device.

15 Claims, 17 Drawing Sheets

FMCW 3-D LADAR IMAGING SYSTEMS AND METHODS WITH REDUCED DOPPLER SENSITIVITY

STATEMENT REGARDING FEDERALLY SPONSORED RESEARCH OR DEVELOPMENT

Not applicable.

FIELD OF THE INVENTION

The present invention generally relates to frequency modulated continuous wave ("FMCW") LADAR imaging, and, in particular, relates to FMCW 3-D LADAR imaging systems and methods with reduced Doppler sensitivity.

BACKGROUND OF THE INVENTION

Optical demodulation allows high-optical-bandwidth LADAR data to be collected with a low-bandwidth electronic camera, using a linear-chirp Frequency Modulated Continuous Wave ("FMCW") architecture. In this method, each pixel of a detector array (e.g., a camera) is illuminated with a local oscillator ("LO") beam, as well as with scattered light from a spot on the target scene. Both sources of light carry the same linear (optical) frequency chirp, but in general arrive with different delays at each pixel because of the different path length through the LO leg vs. the round trip to the particular point at the target scene corresponding to that pixel. As a consequence of this time difference and the linear frequency chirp, a heterodyne signal is formed at each pixel that depends on the difference in delay between the two paths, more difference leading to a higher heterodyne frequency (in the absence of acousto-optic frequency shifters, etc.). A different pixel might be imaging a more distant point on the target, and so produce a different heterodyne signal frequency than another pixel viewing a closer point in the target scene. A Fourier transform of each pixel's time series, acquired during the chirp, therefore, affords a range-density estimate for that pixel. Effectively, a time-series of images taken of the target during the chirp is stacked, and a Fourier transform is performed through the stack. Aliasing can be avoided if the frame rate is high enough to capture at least two images per cycle of the highest heterodyne signal present.

This imaging scheme is ambiguous in range-Doppler, however, as target motion results in Doppler-shifted returns that cannot be distinguished from returns from a different range. The Doppler sensitivity is very high, with a slight radial target velocity sufficient to change range of just $\lambda/2$ (e.g., ~1 micron) during the chirp placing the estimated target range in the next range bin (e.g., 1-100 cm). The range-Doppler ambiguity arising from uniform motion, however, can be measured by taking data during both up-chirps and down-chirps, which have different ambiguity functions, and it can be compensated for by shifting the LO optical frequency by one or more acousto-optic modulators ("AOMs") in either or both of the LO or target light paths. In this way, the highly-shifted return coming from a rapidly, but constantly, moving target can nevertheless be made to produce a low heterodyne frequency compatible with alias-free measurement using low camera frame rates.

Different situations arise, however, if the target moves non-uniformly. If the Doppler shift is not constant, it can't be removed with a simple frequency offset. Ultimately, if the target motion is irregular, and/or the target itself is flexible, the foregoing methods break down, and can provide no useful range information.

SUMMARY OF THE INVENTION

The present invention solves the foregoing problems by providing methods and systems for frequency modulated continuous wave LADAR imaging that utilize two pairs of signals: a chirped laser signal, a constant-frequency laser signal, and delayed local copies thereof. By combining these four signals (two reflected from the target, and two local), Doppler-insensitive range information can be extracted from the resultant data with relatively simple processing techniques (e.g., squaring the signal and performing a Fourier transform to extract the range data for each pixel in an image).

According to one embodiment of the present invention, a method for frequency modulated continuous wave LADAR imaging is provided. The method comprises the steps of generating a chirped laser signal and a constant-frequency laser signal, forming a target laser signal from the chirped laser signal and the constant-frequency laser signal and forming a local oscillator laser signal from the chirped laser signal and the constant-frequency laser signal. The method further comprises delaying or frequency shifting the local oscillator laser signal and directing the target laser signal to a target. The method further comprises combining a returned signal received from the target with the delayed or frequency shifted local oscillator laser signal to form a combined received signal, and capturing the combined received signal with a plurality of image sensors. The method further comprises performing a nonlinear operation on the captured combined received signal and Fourier transforming the captured combined received signal to determine a range corresponding to each of the plurality of image sensors in the imaging device.

According to another embodiment of the present invention, a frequency modulated continuous wave LADAR imaging system is provided. The system comprises a first laser configured to generate a chirped laser signal, a second laser configured to generate a constant-frequency laser signal, divider optics configured to form chirped and constant-frequency local oscillator signals from the chirped laser signal and the constant-frequency laser signal, and optics configured to delay or frequency shift the chirped and constant-frequency local oscillator laser signals. The system further comprises targeting optics configured to direct the chirped laser signal and the constant-frequency laser signal to a target and receiving optics configured to combine a returned signal received from the target with the delayed or frequency shifted chirped and constant-frequency local oscillator laser signals to form a combined received signal. The system further comprises an imaging sensor array configured to capture the combined received signal with a plurality of sensors, circuitry configured to perform a nonlinear operation on the captured combined received signal, and a processor configured to Fourier transform the captured combined received signal to determine a range corresponding to each of the plurality of pixels in the imaging device.

According to yet another embodiment of the present invention, a method for frequency modulated continuous wave LADAR imaging is provided. The method comprises the steps of generating a chirped laser signal and generating a plurality of delayed or frequency shifted local oscillator laser signals from the chirped laser signal. Each of the plurality of delayed or frequency shifted local oscillator laser signals is delayed or frequency shifted from the chirped laser signal by a different amount. The method further comprises directing the chirped laser signal to a target, combining a returned signal received from the target with the delayed or frequency shifted local oscillator laser signals to form a combined received signal, and capturing the combined received signal with a plurality of image sensors. The method further comprises detecting a plurality of range-Doppler bins with a near-zero heterodyne frequency. Each of the plurality of range-Doppler bins corresponds to one of the plurality of delayed or frequency shifted local oscillator laser signals. The method further comprises determining a rate of rotation of the target based upon the detected plurality of range-Doppler bins with a near-zero heterodyne frequency.

According to yet another embodiment of the present invention, a method for frequency modulated continuous wave LADAR imaging is provided. The method comprises the steps of generating a chirped laser signal, directing the chirped laser signal to a target, and sensing a radial motion of a portion of the target with a single-pixel sensor beam. The method further comprises generating a delayed or frequency shifted local oscillator laser signal from the chirped laser signal. The amount by which the local oscillator laser signal is delayed or frequency shifted is determined based upon the sensed radial motion. The method further comprises combining a returned signal received from the target with the delayed or frequency shifted local oscillator laser signal to form a combined received signal, capturing the combined received signal with a plurality of image sensors, and Fourier transforming the captured combined received signal to determine a range of the target.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

A linear Frequency Modulated Continuous Wave ("FMCW") LADAR functions by transmitting a constant power waveform with a highly linear frequency chirp. The returned light is mixed with an optical local oscillator, which is a delayed replica of the transmitted signal, to produce a fluctuating power signal on each pixel of the camera focal plane array. The power signal has three components $P_r$, $P_{LO}$ and $P_{AC}$, where $P_{LO}$ is the local oscillator beam power, $P_r$ is the signal power and $P_{AC}$ is the power in the beat-frequency between the LO and the received signal. This signal is then linearly detected and converted to a photo-current, $$I(t) = I_{LO} + I_r + I_{AC}. \quad (1)$$

Of these three photocurrents only the AC current is of interest. Without noise, this AC signal in any given pixel is composed of a single intermediate frequency ("IF"), which is a linear function of range to the portion of the target viewed by the given pixel. The frequency of the AC signal is estimated by applying peak detection algorithms to the Fast Fourier Transform ("FFT") to produce an estimate of the target range. In some pixels, a noise peak in the Fourier domain may be higher than the signal IF peak. In many of these cases, the peak detection algorithms automatically reject the noise peak based on range in the surrounding pixels and report the signal IF corresponding to the correct target range.

The local oscillator is delayed prior to mixing with the target echo which affects two functions. First, it minimizes the IF, and thus the bandwidth requirements of the detector, by mapping target echo round-trip delay times of $t_o$ to DC. Second, it minimizes an additional loss factor due to waveform edge effects.

The transmitted waveform has constant power, highly linear frequency modulation and a 100% duty cycle. The transmitted frequency follows a saw tooth pattern, linearly sweeping between $f_1$ and $f_2$. The instantaneous waveform frequency of one exemplary FMCW system is graphed in FIG. 1 as a function of time. When the time taken to sweep from $f_1$ to $f_2$ (denoted by the ramp duration $t_r$) is much greater than the tuning bandwidth (i.e., $t_r \gg 1/(f_2-f_1)$), then the waveform bandwidth is well approximated by $B \approx f_2 - f_1$.

Figure 1:
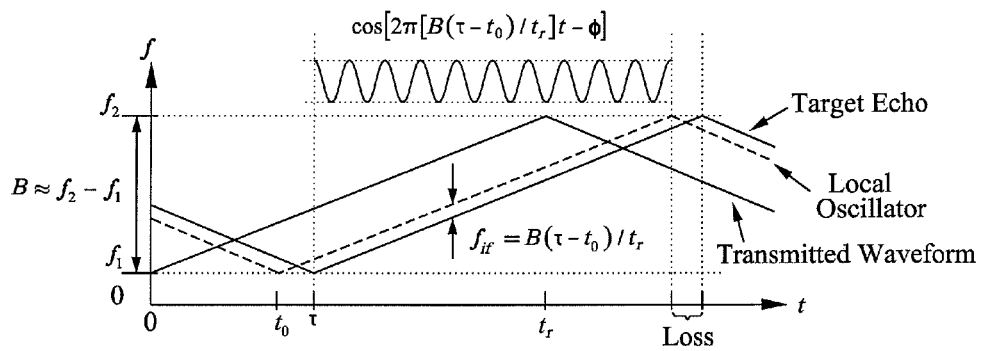
FIG. 1 is a graph illustrating the instantaneous waveform frequency of an exemplary FMCW LADAR system as a function of time, in accordance with one aspect of the present invention.

FIG. 1 shows the transmitted waveform frequency, the target echo frequency delayed by time $\tau$ and the LO frequency delayed by $t_0$. By similar triangles, the following ratios are equal:

$$\frac{f_{if}}{\tau - t_0} = \frac{B}{t_r}. \qquad (2)$$

The target echo delay time, $\tau$, is related to target range by $\tau = 2R/c$. Thus, from the above equation, the IF is related to target range by $$f_{if} = \frac{2B(R - R_0)}{ct_r}, \qquad (3)$$

where $R_0$ is the minimum operating range corresponding to $t_0$, $R_0 = ct_0/2$. A graphic depicting the AC signal at frequency $f_{if}$ appears at the top of FIG. 1. Once an estimate of the IF is made in each pixel, the target range is then computed by $$R = \frac{ct_r f_{if}}{2B} + R_0. \qquad (4)$$

This linear FMCW LADAR receiver is unlike radar chirped waveform receivers in that a matched filter is not employed. Instead, the received echo is mixed with a LO beam which contains the same frequency chirp and hence the chirp is demodulated optically. In other chirped waveform processors, an analog bandwidth equal to B is required throughout the entire detector and signal processing train. In the linear FMCW LADAR approach, the bandwidth requirement of the electronics is vastly reduced. For a stationary target, the required bandwidth of the data acquisition system, $B_a$, is expressed as $$B_a \approx 2B(R_2 - R_1)/(ct_r), \qquad (5)$$

where $R_2 - R_1$ is the range search interval ("RSI"). For moving targets, the required bandwidth is higher. Furthermore, much of the signal processing is accomplished in the optical domain, which has higher fidelity and speed than analog electronics.

The FMCW waveform enables "on the fly" trades between field of view, range resolution, range search interval and dwell time. The bandwidth of the digital camera imposes a maximum signal IF that can be detected. Since range is mapped to frequency, this implies that there is a maximum range search interval based on the camera bandwidth. The camera used in this system has a variable region of interest, which is an activated subset of the available pixels. Having a smaller region of interest decreases the field of view in exchange for a higher frame rate. This relationship between frame rate and number of activated pixels is, $$f_r = \frac{\gamma}{N_{pix}}, \qquad (6)$$

where $f_r$ is the camera frame rate, $\gamma$ is the readout capability in terms of pixels per second, and $N_{pix}$ is the number of camera pixels utilized. Higher frames rates can be achieved with smaller regions of interest. The frame rate of the IR camera using the full 640×512 array is 109 frames per second. This implies that the camera has a readout capability of 640×512×109=36 M pixels/second. If, instead, the data was collected using a smaller 320×256 region of interest, the frame rate would be 367 frames/second, implying a readout capability of 31 M pixels/second. The readout capability is not constant for differently sized regions of interest due to fixed overhead in the readout process. Treating it as a constant, however, is a good approximation and simplifies the following analysis.

According to the Nyquist theorem, the maximum signal IF that can be detected, $f_{max}$, is limited to half the frame rate. In terms of readout capability and number of pixels, $$f_{max} = \frac{\gamma}{2N_{pix}}. \qquad (7)$$

Figure 2:
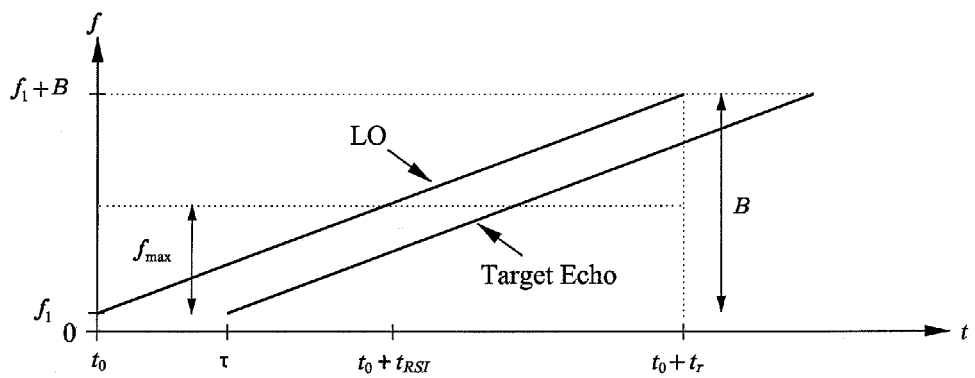
FIG. 2 illustrates exemplary frequency ramps of an exemplary FMCW LADAR system in accordance with one aspect of the present invention.

A single ramp of the local oscillator and single point target echo is depicted in FIG. 2, in accordance with one aspect of the present invention. By similar triangles, $$\frac{f_{max}}{t_{RSI}} = \frac{B}{t_r}, \qquad (8)$$

where $t_{RSI}$ (Range Search Interval time delay) is the maximum time delay between the local oscillator and target return such that the signal IF will be below $f_{max}$. This time delay is related to the range search interval as follows, $$t_{RSI} = \frac{2(R - R_0)}{c} = \frac{2(RSI)}{c}. \qquad (9)$$

Combining Equations 7 through 9 and the equation $\Delta R = c/(2B)$, the following is obtained:

$$N_{pix} \frac{RSI}{\Delta R} = \frac{\gamma t_r}{2} \qquad (10)$$

This expression demonstrates the flexible nature of the FMCW sensor. The ratio RSI/$\Delta R$ is the number of range resolution elements. This ratio multiplied by $N_{pix}$ is the total number of voxels. Thus, the above equation indicates that the total number of voxels is set by the camera readout capability and the ramp duration. A fixed number of voxels may be distributed in space in many different ways depending upon the sensing requirements. For example, FIG. 3 illustrates 3 different ways that 80 voxels may be distributed in space, in accordance with various aspects of the present invention.

While much higher voxel numbers are achievable, only 80 voxels are depicted here for the purpose of illustration.

Figure 3:
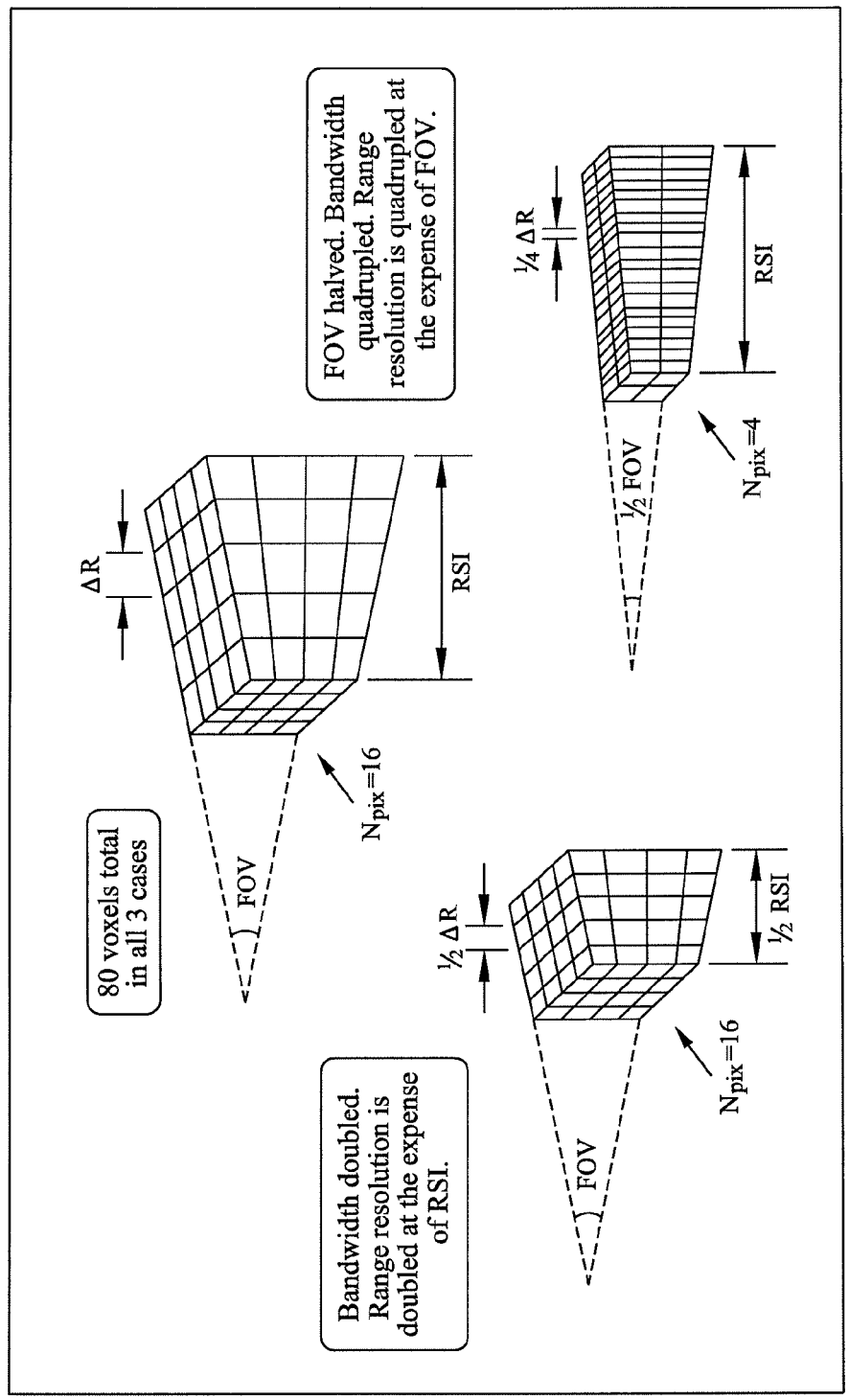
FIG. 3 illustrates a variety of approaches to distributing voxels in space, in accordance with various aspects of the present invention.

The graphic at the top of FIG. 3 depicts a distribution with Npix=16 and 5 range resolution elements. The graphic at the lower left illustrates the trade off between range resolution and range search interval. Doubling the waveform bandwidth doubles the range resolution, but the penalty is a 50% cut in the RSI. The number of range resolution elements is equal in both cases, thus, one can picture this tradeoff as being similar to the motion of an accordion. The lower right graphic illustrates a fourfold improvement in range resolution, compared to the top graphic, at the expense of field of view ("FOV"). The range search interval is unchanged but the FOV is cut in half.

The benefits associated with this signal processing approach do not come without cost. The primary cost is that the required receiver bandwidth is dependent on the range-search interval. Other processors do not have this range-dependent bandwidth requirement. A second cost is that the frequency chirp must be highly linear. Deviations from linearity degrade the carrier-to-noise ratio ("CNR") and range resolution.

Since the FMCW waveform is relatively long, on the order of milliseconds to seconds, there is a high sensitivity to Doppler shift and speckle decorrelation. Range is encoded in the instantaneous frequency of the returned light. A static or varying Doppler shift will alter the frequency of the returned light, thus corrupting the range encoding. Speckle decorrelation will corrupt the range encoding by introducing a random phase modulation on the returned light. Doppler shift may arise from target line of sight motion, platform motion or changes in the refractive turbulence in the atmosphere separating the platform from the target. Speckle decorrelation may arise from target rotation, target translation or changes in the atmospheric refractive turbulence. When speckle decorrelation occurs, there is a random phase shift introduced on the light. This random phase shift occurring through some time duration is equivalent to a frequency shift.

The difficulty of compensating for motion comes from time varying corruption of the returned optical frequency. A static frequency shift, which could arise from a target with a constant line of sight velocity, is relatively simple to correct. However, time varying frequency modulations on the light during the measurement dwell are more difficult to correct. Methods for removing the effects of such time varying frequency modulations are discussed in greater below, in accordance with various aspects of the present invention.

Figure 4A:
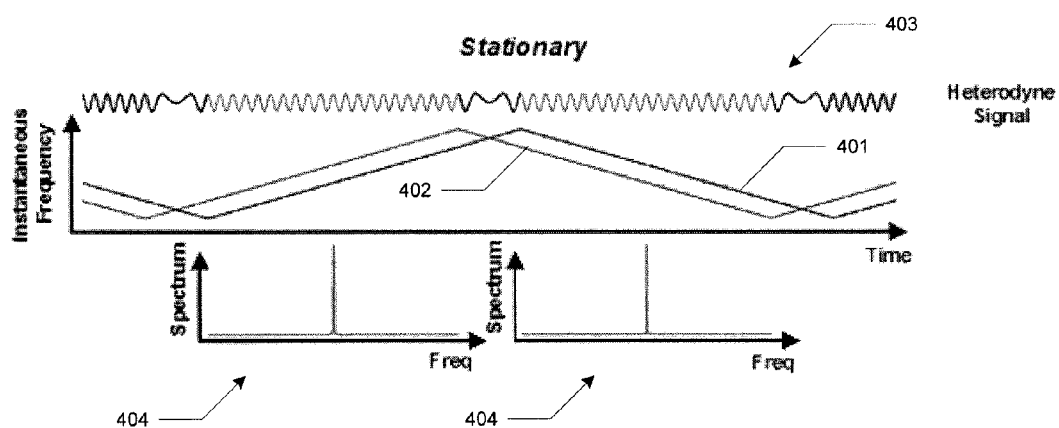
FIGS. 4a and 4b graphically illustrate the corrupting effects of time varying frequency modulation are illustrated in accordance with one aspect of the present invention.
Figure 4B:
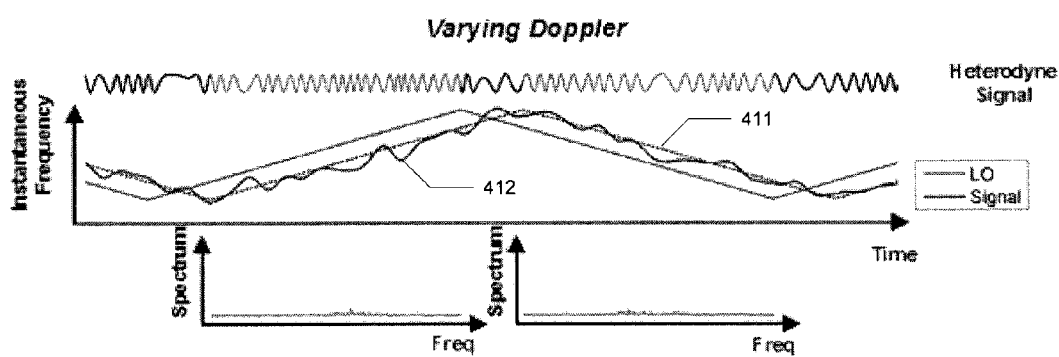

Turning to FIGS. 4a and 4b, the corrupting effects of time varying frequency modulation are illustrated in accordance with one aspect of the present invention. FIG. 4a illustrates an exemplary signal 401 returned to a stationary platform from a stationary target with no atmospheric interference. The frequency of the returned signal is simply a delayed copy of the highly linear LO 402, resulting in a single intermediate frequency with a clearly identifiable peak. The heterodyne signal 403 is illustrated above the instantaneous frequency plot, and linear plots 404 of the spectrum of the heterodyne signal during each ramp appear below. The spectrum shows a single clear peak for the stationary case.

FIG. 4b, by way of comparison, illustrates the corruption due to varying Doppler shift, or equivalently, to speckle decorrelation. The unmodulated signal is designated by reference 411 and the modulated by reference 412. The spectrum of the heterodyne signal is no longer a single identifiable peak. The spectrum is now smeared in a random way and the target range cannot be computed. Furthermore, given the limited camera bandwidth, the spectrum may easily be smeared beyond the available bandwidth in which case those parts of the signal will not be collected at all.

This effect is denoted "micro motion," as very small motion will have a large frequency modulation. For example, suppose the target moves 10 μm in range over 10 ms. The velocity of this motion is 1 mm/s. The induced Doppler shift $f_d$ from this velocity at λ=1550 nm, computed from $$f_d = \frac{2v}{\lambda}, \tag{11}$$

is $f_d$=1.3 kHz. Thus, a significant frequency shift of 1.3 kHz is caused by only a 10 μm change in range. Suppose the target range is changing randomly by +/−10 μm with a velocity of +/−1 mm/s. The spectrum of the IF will then be smeared into +/−1.3 kHz.

Likewise, speckle decorrelation is caused by very small target rotation. Speckle decorrelation from target rotation θ will occur when the target rotates by $$\theta = \frac{\lambda}{\pi\omega}, \tag{12}$$

where ω is the cross range resolution on the target. If the cross range resolution is 1 mm, speckle decorrelation occurs when the target rotates by 0.5 mrad.

Figure 5:
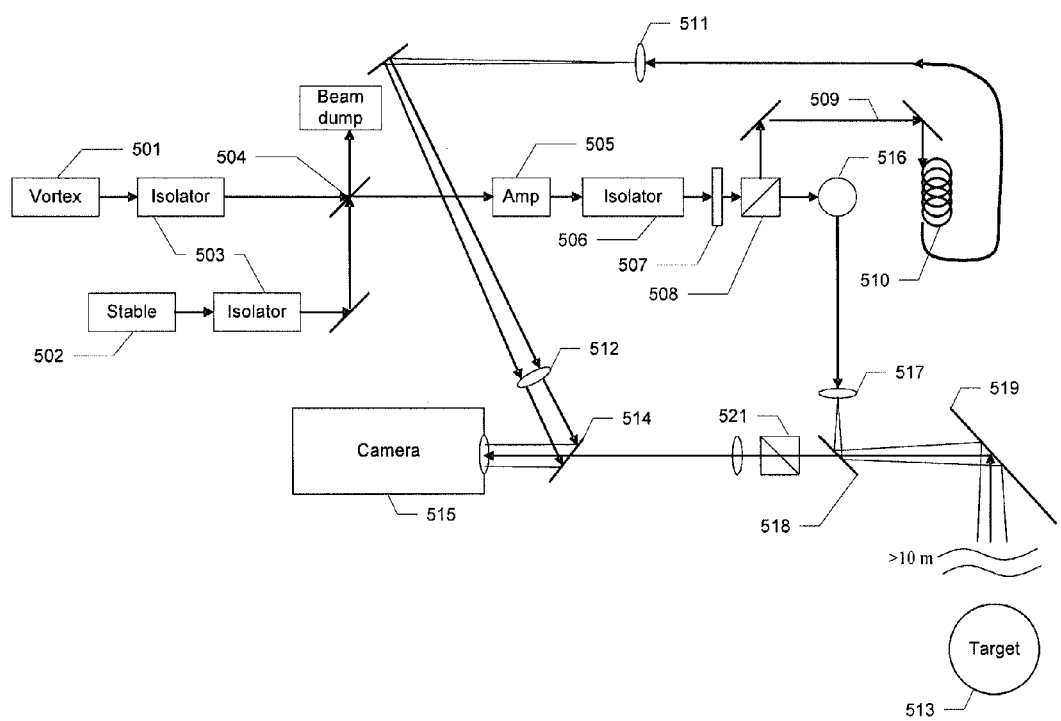
FIG. 5 illustrates an exemplary FMCW LADAR imaging system in accordance with one embodiment of the present invention.

FIG. 5 illustrates an exemplary FMCW LADAR imaging system in accordance with one embodiment of the present invention. For clarity, minor components such as additional waveplates and alignment mirrors have been omitted from this Figure. The system includes two laser sources: tunable laser 501 and single frequency laser 502. According to the present exemplary embodiment, both lasers are external cavity diode lasers. Tunable laser 501 is configured to produce a linear frequency chirped beam and single frequency laser 502 produces a single frequency pilot. The frequency of the pilot is placed outside the tuning range of the chirp, as locating the frequency of the pilot within the tuning range of the chirp may lead to problems in the optical amplifier when the two signals have the same frequency.

Light from the two lasers pass through isolators 503 and are combined on a 20/80 beam splitter 504. The combined light is then directed into a tapered amplifier 505. The output of the amplifier passes through an isolator 506 and into a variable splitter created with a half waveplate 507 and a polarizing beam splitter ("PBS") 508. The light reflected from the PBS is used as a local oscillator ("LO") 509. The LO is passed through a 12 m fiber delay 510, producing 18 m of optical path length delay (due to the 1.5 index of refraction within the fiber). This 18 m delay creates a minimum operating range of 9 m, 1 m in front of a 10 m target. LO 509 passes through a two lens beam expander 511 and 512 before combining with the light returned from the target 513 on a 50/50 BS 514 and entering the camera 515.

The output beam from tapered amplifier 505 that passes through the PBS is transmitted to target 513. It enters a periscope 516 bringing it to a medium elevation. The beam is then directed to a lens 517 causing the beam to diverge so it can illuminate the whole target 513. The beam is then reflected off a mirror 518 which sits just below the receive aperture. Thus, the system is bistatic. A bistatic system was build to eliminate problems associated with transmitter feed through. The transmitted beam reflects off another mirror 519 and travels to target 513.

The return light is imaged onto the camera focal plane array by an imaging lens 520 after passing through a PBS 521 which rejects all vertically polarized components. The LO is horizontally polarized. Only like polarizations will interfere, thus any depolarized component of the return light is removed. The return light mixes with the LO on the 50/50 beam splitter and finally enters the camera.

In the present exemplary embodiment, two waveforms are broadcast: the linear chirp, and a fixed-frequency pilot tone. The linear chirp is sensitive to target range and also to target velocity. The unchanging tone is only sensitive to target velocity. Both are interfered with their corresponding LOs at the camera array, such that light from all four sources impinge on the photodetector pixels comprising the camera: chirped LO light, chirped target return, fixed-frequency LO light, and fixed-frequency target return. The bandwidth of the chirp is assumed to be much greater (e.g., ~100 GHz) than the camera bandwidth (e.g., in kHz or even MHz), that interference terms between the chirped and unchirped light may be neglected. Accordingly, the photodetector pixels respond to the simple (non-vector) sum of the two interference tones, arising respectively from the chirped and unchirped pairs of beams. In this case, the Doppler shifts result in a wildly-varying frequency of the received heterodyne terms, but the amplitude of the return, irrespective of the phase or frequency, becomes sinusoidally modulated at a frequency corresponding to the range almost exclusively, with a greatly reduced Doppler effect. This envelope may be detected or moved to baseband, by performing a nonlinear operation (e.g., squaring) on the received signal.

If the Doppler shifts arising from target motion do not shift the heterodyne signal beyond the camera's Nyquist bandwidth, the digitized signal can be squared or otherwise digitally processed with any other nonlinear function, in software. The resulting dataset can then be Fourier transformed for extraction of the desired range return(s). For example, for a camera with a 40 kHz frame rate (i.e., a 20 kHz Nyquist bandwidth) and a LADAR system operated at a 1.5 micron wavelength, Doppler shifts of up to 20,000 waves/second round trip, or 15 mm/sec one-way velocity, can be compensated. In this scheme, pixels are independent from one another, so there is no constraint or assumptions about range, relative motion, or velocity profile that could be corrected from pixel to pixel, other than that the maximum peak velocity remain below the Nyquist limit. Velocities exceeding this limit may potentially be detected if assumptions about aliasing are correctly made, and the SNR is sufficient. Aliasing amplitude may be increased, at the expense of detected signal strength, by shortening the integration time, keeping the frame rate constant.

Alternatively, for heterodyne signals that may lie beyond ordinary cameras' readout Nyquist bandwidth, a modified photoreceiver array can be provided with nonlinear electrical devices between each photodetector and the corresponding charge-storage capacitor. For example, a simple diode, suitably biased, could be placed between the photodetector and the photocurrent charge storage capacitor. This would afford envelope detection in the same way that a diode detector does in an AM radio, and for the same reason. In this case, the bandwidth limit imposed by the readout rate no longer limits the peak velocities that may be measured. Instead, the raw bandwidth of the combination of the photodetector and nonlinear device sets the new limit. For example, if the photodetector had a 3 dB analog bandwidth of 10 MHz, and if the diode exceeded this (as is typically the case), then peak one-way velocities of 5 million wavelengths/second, or 7.5 m/s, would still place the heterodyne returns within the detector bandwidth. The nonlinear detector extracts from this waveform the low-frequency amplitude envelope, and this latter signal is the only one constrained by the Nyquist limit arising from the array readout rate. Target velocities exceeding the 3 dB bandwidth of the photodetector would still be detected at reduced amplitude, but would not alias as in the case of the software detection scheme. Arrays could be made consisting of individual detector elements and diodes each of which have 100 MHz or even 1 GHz 3 dB bandwidths, pushing the 3 dB-down velocity limits to 75 or 750 m/s, respectively. Additionally, gross Doppler can already be removed by a frequency-offset of the LO beams, so long as the Doppler applies equally to all points on the target. The above velocities apply in the case of relative motion, when one point of the target is moving towards or away from the camera at 75, or 750, m/s relative to another point in the same scene.

This scheme simultaneously compensates for another deleterious effect of target motion: speckle decorrelation. When the target rotates slightly, the speckle pattern at the receiver's focal plane array will translate. Once one speckle realization translates out of a given pixel's area and a new speckle realization enters, a random phase shift, uniformly distributed between 0 and $2\pi$, will be introduced. The amount of target rotation that will cause this phase shift is approximately $\lambda/(\pi\omega)$, where $\omega$ is the cross range resolution on the target (the length of the target plane image of a pixel). For example, when the cross range resolution is 1 mm, speckle decorrelation occurs when the target rotates by only 0.5 mrad (for $\lambda$=1.5 microns). This time-varying phase modulation will corrupt the range measurement in the same way as a time-varying Doppler shift. By placing the optical frequencies of the pilot and the linear chirp close to each other, the phase modulation induced on each signal will be nearly equivalent and thus the corruption is almost entirely removed by this method.

Figure 6:
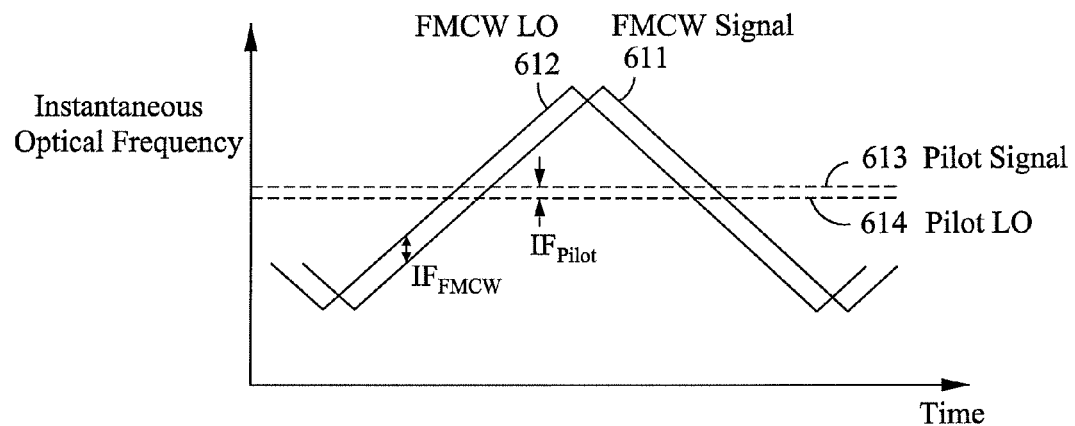
FIG. 6 illustrates the signals provided by one exemplary FMCW LADAR imaging system, in accordance with one embodiment of the present invention.

The signals provided by an exemplary FMCW LADAR imaging system are illustrated in FIG. 6, in accordance with one embodiment of the present invention. The FMCW signal and LO from a stationary platform/target are represented by lines 611 and 612 respectively. The intermediate beat frequency due to the FMCW light is represented as $IF_{FMCW}$. The pilot signal from a stationary platform/target is represented by line 613 and the pilot LO by line 614. These frequencies are frequency shifted by two AOMs to create an intermediate beat frequency $IF_{Pilot}$.

According to one aspect of the present invention, the optical frequency of the pilot tone is placed in the middle of the tuning range of the FMCW signal. The frequencies of the pilot and FMCW are as close as possible to ensure that the speckle pattern from each signal is nearly the same. If they were not the same, the speckle decorrelation would be different for each.

Figure 7A:
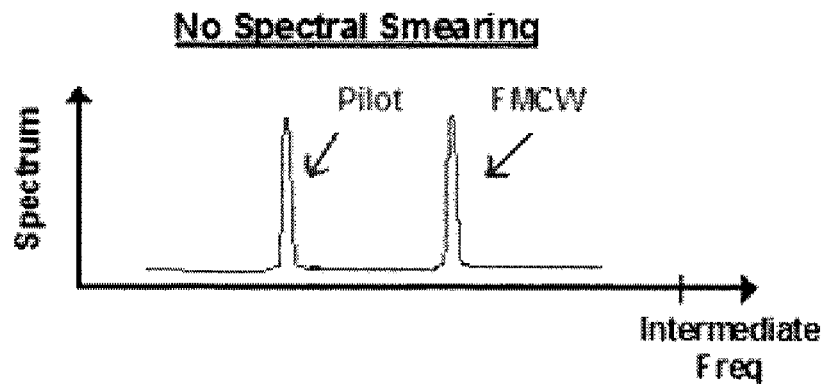
FIGS. 7a and 7b are plots of the spectrum of heterodyne signals of an exemplary FMCW LADAR imaging system in accordance with various aspects of the present invention.
Figure 7B:
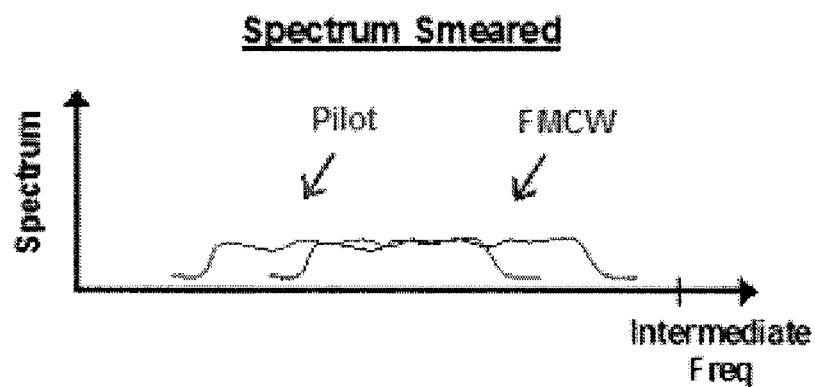

When there is no spectral smearing, the spectrum of the heterodyne signal resembles the plot of FIG. 7a. Although the FMCW signal has a time varying optical frequency, the demodulated heterodyne signal is a single tone intermediate frequency for a stationary target. Thus, the spectrum of heterodyne signal for a stationary target has two sharp peaks: one corresponding to the FMCW IF and the other to the pilot IF. As can be seen with reference to FIG. 7a, there is mixing between the FMCW light and the pilot light. This interference, however, will be wideband, adding slightly to the noise floor. Furthermore, the bandwidth of this component will be in the 10's of GHz and thus will be within the camera bandwidth for only a fraction of the dwell time. The plot of FIG. 7b illustrates the spectrum of the heterodyne signal when the spectrum is smeared by varying target micro motion.

Figure 8:
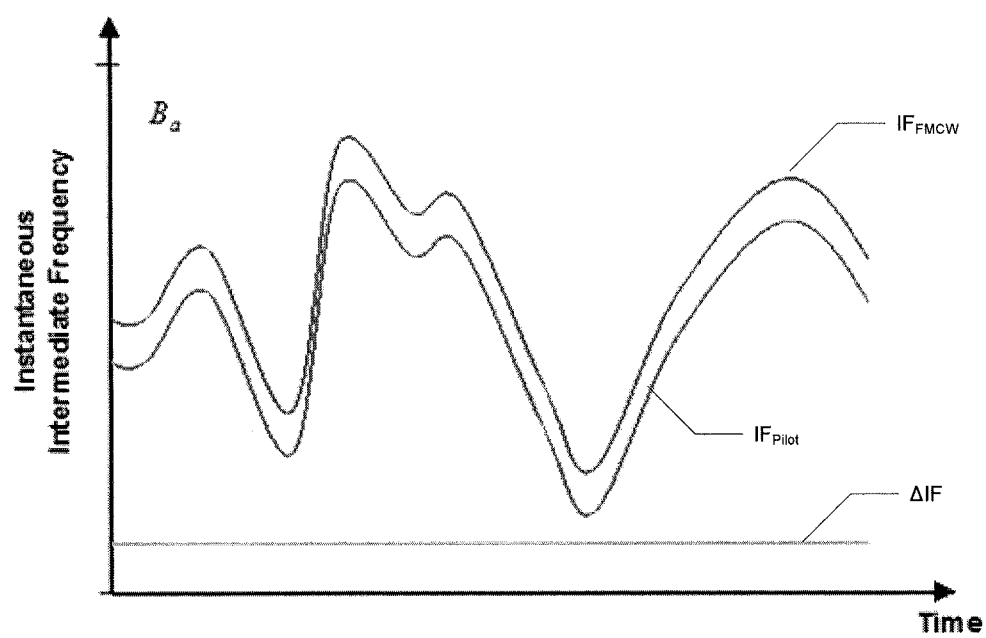
FIG. 8 illustrates varying intermediate frequencies caused target motion, in accordance with one aspect of the present invention.

The compensation system functions by detecting the instantaneous frequency difference between the beat frequency of the pilot tone and the beat frequency of the FMCW signal. This frequency difference will be constant thorough time regardless of micro motion. FIG. 8 illustrates the two varying intermediate frequencies caused by micro motion with a constant frequency difference, in accordance with one aspect of the present invention. Range is computed from the difference frequency, $\Delta$IF.

Figure 9:
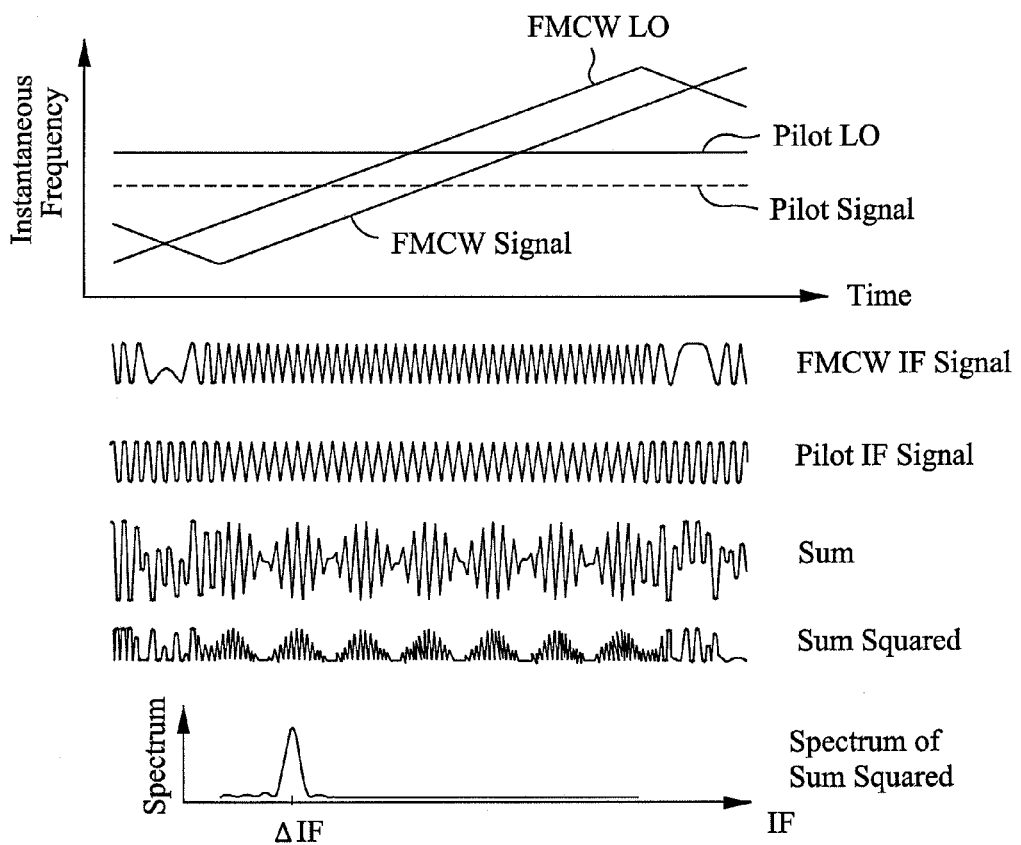
FIG. 9 depicts the signals between a static target and platform, in accordance with one aspect of the present invention.

This method of motion compensation by differential IF detection is illustrated in more detail in FIGS. 9 to 12. Each figure contains illustrations of the FMCW IF, the pilot IF, their sum and their sum squared. FIG. 9 depicts the signals between a static target and platform, in accordance with one aspect of the present invention. At the top are shown the instantaneous optical frequencies of the FMCW signal and LO and the pilot signal and LO. Since the target and platform is stationary, the returned signals do not have any random frequency modulation. Below these are plots of the heterodyne signals due to the FMCW signal mixing with the FMCW LO creating the FMCW IF and the pilot signal mixing with the pilot LO creating the pilot IF. The intermediate frequency of these two signals are made slightly different by selection of the pilot AOM frequency shift. Below these is shown an illustration of the sum of the two IF signals. This signal has an amplitude envelope that oscillates at the IF difference frequency. This difference frequency is detected by squaring the signal, as shown below the sum, and computing the Fourier transform, as shown at the bottom. Target range is computed from the peak at the IF difference frequency, $\Delta$IF.

Figure 10:
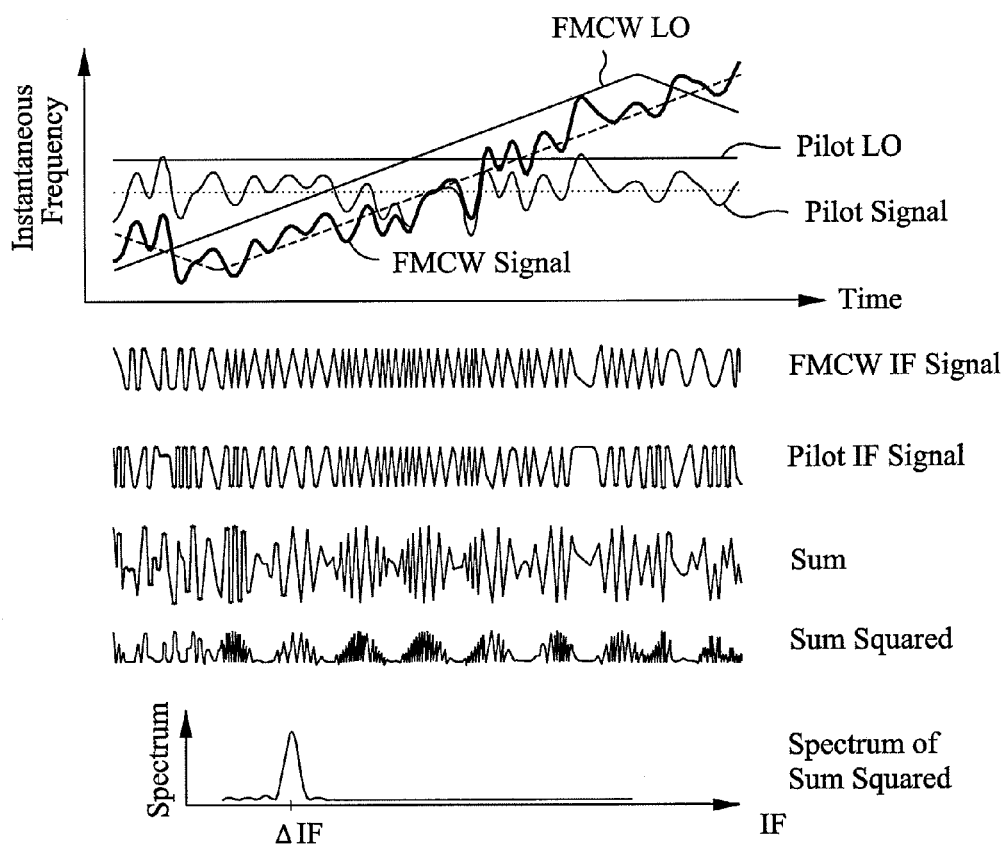
FIG. 10 depicts the effect of target motion on the signals between a platform and the target, in accordance with one aspect of the present invention.

Turning to FIG. 10, the effect of target motion is illustrated with a target at the same range as the previous figure, in accordance with one aspect of the present invention. Target motion introduces random frequency modulation that now appears on the optical FMCW and pilot signals instantaneous frequencies, as is illustrated by the plot of IF over time. The dashed lines correspond to the instantaneous frequencies expected if the target were stationary. As can be seen with reference to FIG. 10, despite target motion induced frequency modulation, the IF sum has the very same amplitude envelope oscillating at the same frequency as FIG. 9. The spectrum of the sum squared shows a peak at this frequency, indicating the target range at the same range.

Figure 11:
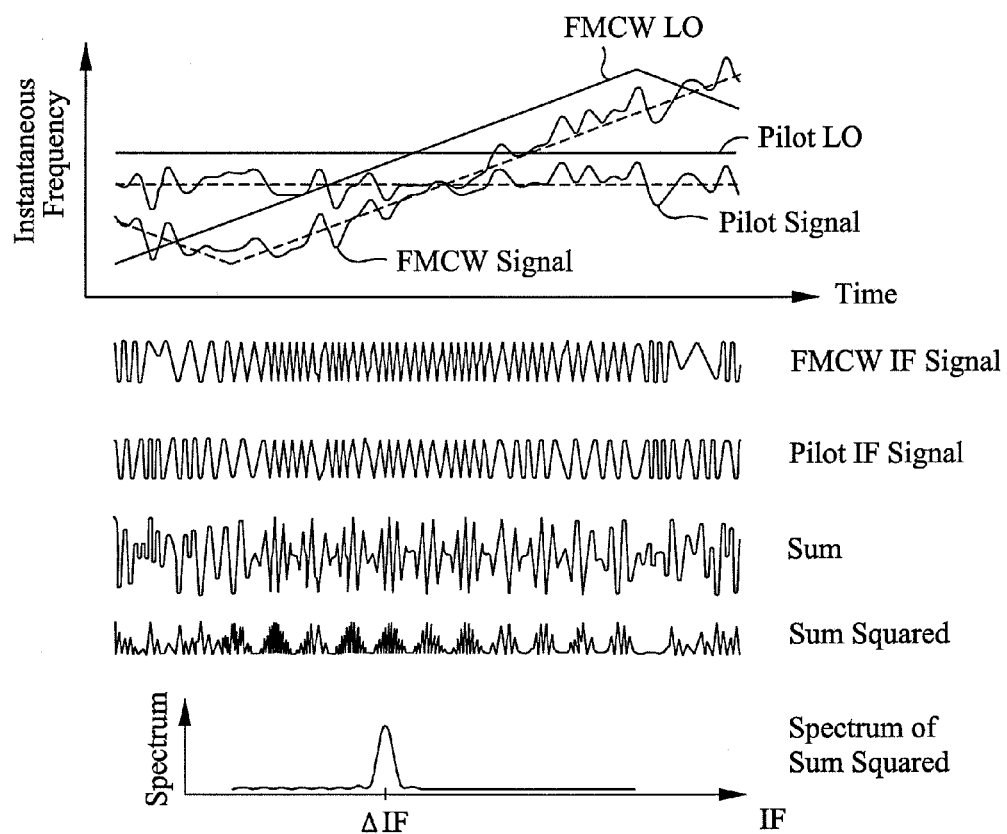
FIG. 11 depicts the signals between a platform and a moving target with an independent realization of random target motion, in accordance with one aspect of the present invention.

FIG. 11 illustrates a moving target at a longer range with an independent realization of random target motion, in accordance with one aspect of the present invention. In this case, the envelope of the IF sum oscillates at a higher frequency since the range to the target is larger. The peak in the spectrum of the sum squared has shifted to the right.

Figure 12:
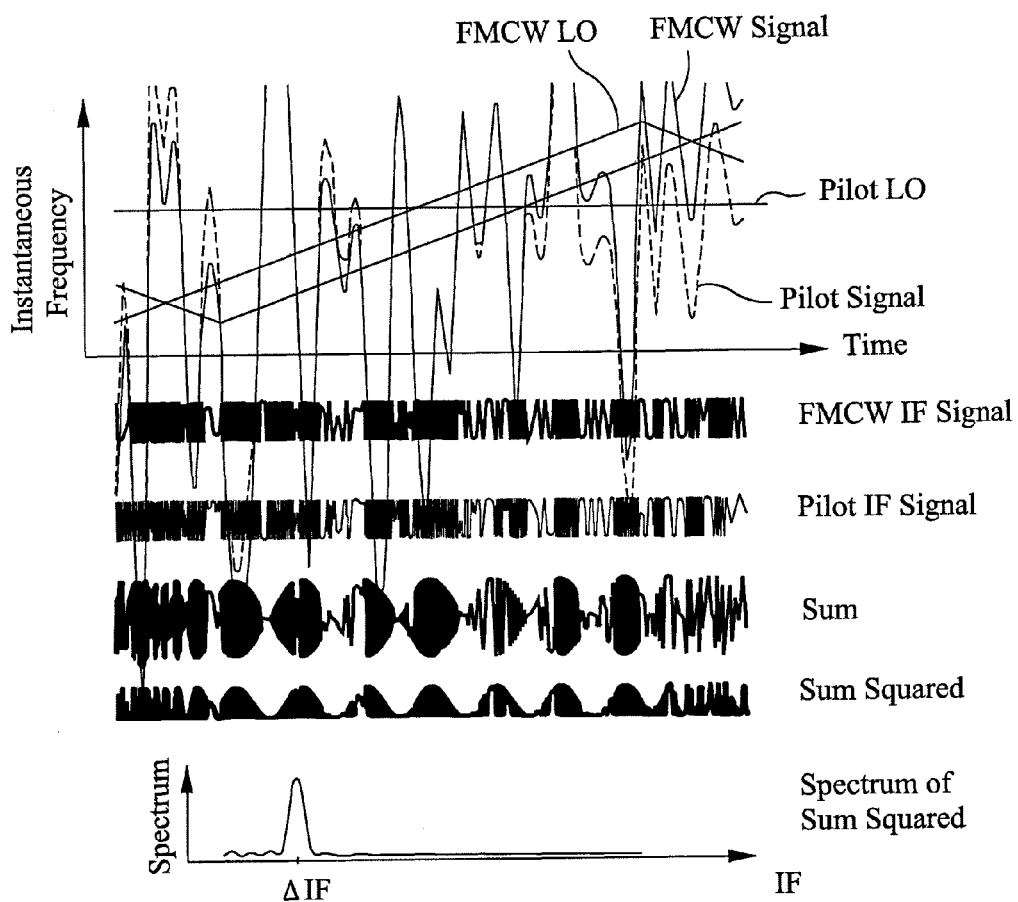
FIG. 12 illustrates a large target-induced frequency modulation which can nevertheless be compensated, in accordance with one aspect of the present invention.

FIG. 12 illustrates that the target induced frequency modulation can be quite large without corrupting this motion compensated ranging method, in accordance with one aspect of the present invention. This figure also illustrates that this method allows the intermediate frequency to cross zero and become negative.

This method of motion compensation may be described mathematically as follows. To fully describe the method, we will begin with a model of the optical signals and derive a representation of the square of the sum of the IF signals. Let the transmitted FMCW optical field in the transmit aperture plane be represented by $$U_{xa}^{(1)}(x, y, t) = \sqrt{2z_m I_{xa}^{(1)}(x, y, t)} \cos\left[2\pi\left(f_1 t + \frac{B}{2t_r}t^2\right)\right], \quad (13)$$

where the subscript 'x' denotes 'transmitted', the subscript 'a' denotes 'transmit aperture plane', the superscript '(1)' denotes FMCW, $f_1$ is the carrier frequency as in FIG. 1, $z_m$ is the impedance of the medium, and $I_{xa}^{(1)}(x,y,t)$ is the transmitted FMCW irradiance in the aperture plane. The transmitted FMCW power, $P_x^{(1)}(t)$, is $$P_x^{(1)}(t) = \int_{aperture} \int I_{xa}^{(1)}(x, y, t) dx\, dy, \quad (14)$$

The instantaneous frequency f(t) is $$f(t) = \frac{1}{2\pi} \frac{d\phi}{dt}, \quad (15)$$

where $\phi$ is the phase. The instantaneous frequency of the FMCW optical field is $$f(t) = f_1 + \frac{B}{t_r} t, \quad (16)$$

which is a linear frequency chirp from $f_1$ at t=0 to $f_1$+B at t=$t_r$.

The exponential representation of the field is $$\tilde{U}_{xa}^{(1)}(x, y, t) = \sqrt{2z_m I_{xa}^{(1)}(x, y, t)} \exp\left[2\pi i\left(f_1 t + \frac{B}{t_r}t^2\right)\right]. \quad (17)$$

The normalized complex representation of the field is defined as $$u_{xa}^{(1)}(x, y, t) = \frac{1}{\sqrt{2z_m}} \tilde{U}_{xa}^{(1)}(x, y, t) = \sqrt{I_{xa}^{(1)}(x, y, t)} \exp\left[2\pi i\left(f_1 t + \frac{B}{t_r}t^2\right)\right]. \quad (18)$$

With this definition, the following simple relation exists between field and irradiance.

$$|u_{xa}(x,y,t)|^2 = I_{xa}(x,y,t). \quad (19)$$

Likewise the normalized complex representation of the transmitted pilot optical field in the transmit aperture plane is $$u_{xa}^{(2)}(x,y,t) = \sqrt{I_{xa}^{(2)}(x,y,t)} \exp[2\pi i f_{xp} t], \quad (20)$$

where the superscript '(2)' denotes pilot and $f_{xp}$ is the transmitted pilot optical frequency. The transmitted pilot power, $P_x^{(2)}(t)$, is $$P_x^{(2)}(t) = \int_{aperture} \int I_{xa}^{(2)}(x, y, t) dx\, dy. \quad (21)$$

For a zero depth stationary target, the received FMCW optical field is an attenuated version of the transmitted signal delayed by the round trip delay time. The round trip delay time, $\tau$, is related to the target range, R, as shown below.

$$\tau(t) = \frac{2}{c} R\left(t - \frac{\tau(t)}{2}\right). \quad (22)$$

This relationship is exact and is valid for any target motion R(t). Let the time at which the light impinges upon the target be denoted T where $$T = t - \frac{\tau(t)}{2}. \quad (23)$$

Thus, the normalized complex representation of the received FMCW optical field in the detector plane is $$u_{sd}^{(1)}(x, y, t) = \sqrt{I_{sd}^{(1)}(x, y, t)} \exp\left[2\pi i\left(f_1\left[t - \frac{2R(T)}{c}\right] + \frac{B}{2t_r}\left[t - \frac{2R(T)}{c}\right]^2\right) + i\phi(t)\right], \quad (24)$$

where the subscript 's' denotes 'signal', 'd' denotes 'detector plane', and $I_{sd}^{(1)}(x,y,t)$ is the received irradiance in on the detector plane. The phase term $\phi$ arises from the speckle decorrelation. Each speckle lobe has a random phase that is uniformly distributed over $2\pi$. When the speckle pattern decorrelates due to target rotation, $\phi$ will take on a new value anywhere between 0 and $2\pi$. The received signal power is on a given pixel is $$P_s^{(1)}(t) = \int_{pixel}\int I_{sd}^{(1)}(x, y, t)dx\,dy. \quad (25)$$

Likewise, the normalized complex representation of the received pilot optical field in the detector plane is $$u_{sd}^{(2)}(x, y, t) = \sqrt{I_{sd}^{(2)}(x, y, t)} \exp\left[2\pi i f_{xp}\left[t - \frac{2R(T)}{c}\right] + i\phi(t)\right], \quad (26)$$

where $\phi(t)$ is the identical phase modulation function due to speckle decorrelation. The FMCW local oscillator is the transmitted signal without the round trip delay. For simplicity, let R in this section denote relative range. Thus, the LO delay time $t_0$ from equation 2 is equal to zero. The normalized complex representation of the FMCW local oscillator field on the detector plane is $$u_{od}^{(1)}(x, y, t) = \sqrt{I_{od}^{(1)}(x, y, t)} \exp\left[2\pi i\left(f_1 t + \frac{B}{2t_r}t^2\right)\right]. \quad (27)$$

The pilot local oscillator field is $$u_{od}^{(2)}(x,y,t) = \sqrt{I_{od}^{(2)}(x,y,t)}\exp[2\pi i f_{op}t], \quad (28)$$

where $f_{op}$ is the frequency of the pilot local oscillator. It may be different from $f_{xp}$, the transmitted frequency, due to an AOM frequency shifter. The received signal power on a given pixel is $$P_s^{(2)}(t) = \int_{pixel}\int I_{sd}^{(2)}(x, y, t)dx\,dy. \quad (29)$$

The total irradiance on the detector plane is the magnitude squared of the sum of all four optical fields, $$I(x,y,t)=|u_{sd}^{(1)}(x,y,t)+u_{od}^{(1)}(x,y,t)+u_{sd}^{(2)}(x,y,t)+u_{od}^{(2)}(x,y,t)|^2 \quad (30)$$

Substituting the above expressions for the fields gives the following expression.

$$I(x, y, t) = I_{sd}^{(1)}(x, y, t) + I_{od}^{(1)}(x, y, t) + \quad (31)$$
$$I_{sd}^{(2)}(x, y, t) + I_{od}^{(2)}(x, y, t) + 2\sqrt{I_{od}^{(1)}(x, y, t)I_{sd}^{(1)}(x, y, t)}$$
$$\cos\left[2\pi\left(\frac{2R(T)}{\lambda_1} + \frac{2BR(T)t}{ct_r} + \frac{2BR^2(T)}{c^2 t_r}\right) - \phi(t)\right] +$$
$$2\sqrt{I_{od}^{(2)}(x, y, t)I_{sd}^{(2)}(x, y, t)}\cos\left[2\pi\left(\frac{2R(T)}{\lambda_{xp}} + (f_{op} - f_{xp})t\right) - \phi(t)\right] +$$
$$2\sqrt{I_{od}^{(1)}(x, y, t)I_{od}^{(2)}(x, y, t)}\cos\left[2\pi\left(f_{op}t - f_1 t - \frac{Bt^2}{2t_r}\right)\right] +$$
$$2\sqrt{I_{od}^{(1)}(x, y, t)I_{sd}^{(2)}(x, y, t)}$$
$$\cos\left[2\pi\left(-\frac{2R(T)}{\lambda_{xp}} - f_1 t + f_{xp}t - \frac{Bt^2}{2t_r}\right) + \phi(t)\right] +$$
$$2\sqrt{I_{sd}^{(1)}(x, y, t)I_{od}^{(2)}(x, y, t)}\cos\left[$$
$$2\pi\left(\frac{2R(T)}{\lambda_1} - f_1 t + f_{op}t - \frac{2BR^2(T)}{c^2 t_r} + \frac{2BR(T)}{ct_r} - \frac{Bt^2}{2t_r}\right) - \phi(t)\right] +$$
$$2\sqrt{I_{od}^{(1)}(x, y, t)I_{sd}^{(2)}(x, y, t)}$$
$$\cos\left[2\pi\left(\frac{2R(T)}{\lambda_1} - \frac{2R(T)}{\lambda_{xp}} - f_1 t + f_{xp}t - \frac{2BR^2(T)}{c^2 t_r} + \frac{2BRt}{ct_r} - \frac{Bt^2}{2t_r}\right)\right]$$

The subscripts on $\lambda$ have the same meaning as the subscripts on f. The first 4 terms are DC irradiance values followed by 6 cosine terms resulting from pair-wise mixing of the fields. Only the first two cosine terms are of interest. Each of the last 4 cosine terms all have $t^2$ in their arguments indicating that they are chirped terms. The bandwidth of the waveform will be on the order of 50 GHz while the bandwidth of the camera will be on the order of 50 kHz. These chirped signals will be within the camera bandwidth for a fraction of the ramp duration equal to 50 GHz/50 kHz $t_r$. Thus, the chirped signals will be within the camera bandwidth a very small fraction of the time and will have a negligible affect.

The first cosine term results from the mixing of the FMCW signal with its LO. The second term in its argument, $$2\pi\frac{2BR(T)}{ct_r}t$$

is the IF term we expect from equation 3 that provides target range information. When R(T) is constant, it is linear in time so it is a single frequency component. The second term in the argument, $$2\pi\frac{2BR^2(T)}{c^2 t_r}$$

may be neglected since $c^2$, a very large number, appears in the denominator causing the term to be very small. This term will be carried for the time being and dropped later. The first term in the argument, $$2\pi \frac{2R(T)}{\lambda_1},$$

is a phase modulation term that is highly sensitive to small changes in range. This is where the sensitivity to micro motion arises. The instantaneous frequency of this term is $2v(T)/\lambda$, which is the Doppler shift (see equation 11). The last term is the speckle decorrelation phase modulation, $\phi(t)$.

The second cosine term results from the mixing of the pilot signal with its LO. The first term of its argument, $$2\pi \frac{2R(T)}{\lambda_{xp}}$$

is a phase modulation due to small changes in target range. This phase modulation term will later cancel the similar term in the FMCW signal. The second term is a single frequency term that oscillates at the frequency of the AOM shift between the transmitted pilot and the pilot LO, $f_{op}-f_{xp}$. The last term is the speckle decorrelation phase modulation.

Including only the terms of interest, the total irradiance can be approximately expressed as $$I(x, y, t) = I_{sd}^{(1)}(x, y, t) + I_{od}^{(1)}(x, y, t) + \qquad (32)$$
$$I_{sd}^{(2)}(x, y, t) + I_{od}^{(2)}(x, y, t) + 2\sqrt{I_{od}^{(1)}(x, y, t)I_{sd}^{(1)}(x, y, t)}$$
$$\cos\left[2\pi\left(\frac{2R(T)}{\lambda_1} + \frac{2BR(T)t}{ct_r} + \frac{2BR^2(T)}{c^2 t_r}\right) - \varphi(t)\right] +$$
$$2\sqrt{I_{od}^{(2)}(x, y, t)I_{sd}^{(2)}(x, y, t)} \cos\left[2\pi\left(\frac{2R(T)}{\lambda_{xp}} + (f_{op} - f_{xp})t\right) - \varphi(t)\right]$$

The photocurrent of a photovoltaic detector is equal to $$j(t) = \iint \mathfrak{R}(x,y) I(x,y,t) dx dy, \qquad (33)$$

where j(t) is the photocurrent, I(x,y,t) is the irradiance on the detector and $\mathfrak{R}$ is the detector responsivity. Assuming a uniform responsivity over the finite pixel, the photocurrent is $$j(t) = P_s^{(1)}(t) + P_o^{(1)}(t) + P_s^{(2)}(t) + P_o^{(2)}(t) + 2\sqrt{\eta_1 P_o^{(1)}(t) P_s^{(1)}(t)} \qquad (34)$$
$$\cos\left[2\pi\left(\frac{2R(T)}{\lambda_1} + \frac{2BR(T)t}{ct_r} + \frac{2BR^2(T)}{c^2 t_r}\right) - \varphi(t)\right] +$$
$$2\sqrt{\eta_2 P_o^{(2)}(t) P_s^{(2)}(t)} \cos\left[2\pi\left(\frac{2R(T)}{\lambda_{xp}} + (f_{op} - f_{xp})t\right) - \varphi(t)\right]$$

where $\eta_1$ is the heterodyne efficiency of the mixing of the FMCW signal and LO, and $\eta_2$ is the heterodyne efficiency of the mixing of the pilot signal and LO. The photocurrent is converted to number of camera counts by some counts per current factor G. Camera counts, x(t) is equal to $$x(t) = Gj(t). \qquad (35)$$

To create energy at the instantaneous frequency difference between the two cosine terms in the photocurrent, and thus to cancel common phase modulation, the camera count signal is squared. The squared signal is $$x^2(t) = \qquad (36)$$
$$G^2 \Big[ (P_0^{(1)}(t))^2 + (P_o^{(2)}(t))^2 + (P_s^{(1)}(t))^2 + (P_s^{(2)}(t))^2 + 2P_o^{(1)}(t)P_s^{(1)}(t) +$$
$$2P_o^{(1)}(t)P_o^{(2)}(t) + 2P_s^{(1)}(t)P_o^{(2)}(t) + 2P_o^{(1)}(t)P_s^{(2)}(t) + 2P_s^{(1)}(t)P_s^{(2)}(t) +$$
$$2P_o^{(2)}(t)P_s^{(2)}(t) + 2\eta_1 P_o^{(1)}(t)P_s^{(1)}(t) + 2\eta_2 P_o^{(2)}(t)P_s^{(2)}(t) +$$
$$4\sqrt{\eta_1 \eta_2 P_o^{(1)}(t)P_o^{(2)}(t)P_s^{(1)}(t)P_s^{(2)}(t)}$$
$$\cos\left[2\pi\left((f_{xp} - f_{op})t + \frac{2R(T)}{c}\left(f_1 - f_{xp} + B\frac{t}{t_r}\right) - \frac{2BR^2(T)}{c^2 t_r}\right)\right]\Big]$$

where the only cosine term listed is the cosine of the phase difference. All other cosine terms are broadband due to target motion. The cosine term listed above does not contain the speckle decorrelation phase modulation $\phi(t)$ since it has been cancelled out. The phase of the cosine term above is equal to $$\theta(t) = 2\pi\left((f_{xp} - f_{op})t + \frac{2R(T)}{c}\left(f_1 - f_{xp} + B\frac{t}{t_r}\right) - \frac{2BR^2(T)}{c^2 t_r}\right), \qquad (37)$$

The phase modulation due to Doppler shift from target motion is now severely reduced. To demonstrate this, assume that the target motion is small around $R=R_1$ allowing us to make the following approximation.

$$T \approx t - \frac{R_1}{c}, \qquad (38)$$

This enables a simple computation of the derivative to express the instantaneous frequency, f(t), $$f(t) = \frac{1}{2\pi}\frac{d\theta}{dt} = \qquad (39)$$
$$(f_{xp} - f_{op}) + \frac{2BR(T)}{ct_r} + \frac{2R'(T)}{c}\left[f_1 - f_{xp} + B\frac{t}{t_r}\right] - \frac{4BR(T)R'(T)}{c^2 t_r}.$$

The last term may be neglected due to the $c^2$ in the denominator. The first term is the AOM shift between the transmitted pilot and the pilot LO. The second term is the FMCW IF, equation 3. The third term is the reduced Doppler shift. When $f_{xp}$ is placed in the center of the FMCW tuning range, the factor $$\left[f_1 - f_{xp} + B\frac{t}{t_r}\right]$$

is at most equal to B/2. Suppose B=100 GHz. Then the largest frequency modulation due to a 5 mm/s target line of sight velocity is $$\frac{2(5 \text{ mm/s})}{c}(50 \text{ GHz}) = 1.7 \text{ Hz}.$$

Recall, without the motion compensation, the Doppler shift from a 5 mm/s velocity would be $$\frac{2(5 \text{ mm/s})}{c}\left(\frac{c}{780 \text{ nm}}\right) = 12.8 \text{ kHz}.$$

The spectrum of $x^2(t)$ will show a peak at $$f = \frac{2BR}{ct_r}$$

broadened by a few Hz assuming that the target stays within one range resolution element. If the entire target has a gross line of sight velocity causing it to move beyond one range bin during the dwell time, the peak will be broadened. This broadening is relatively simple to correct in post processing. This can be achieved with a single pixel detector which measures the gross Doppler shift and corrects either in post-processing or by introducing a quadratic term to the frequency chirp.

In conclusion, the spectrum of $x^2(t)$ will have a peak corresponding to the target range with a very small sensitivity to target micro motion. Target range may be computed from the frequency of this peak.

Figure 13A:
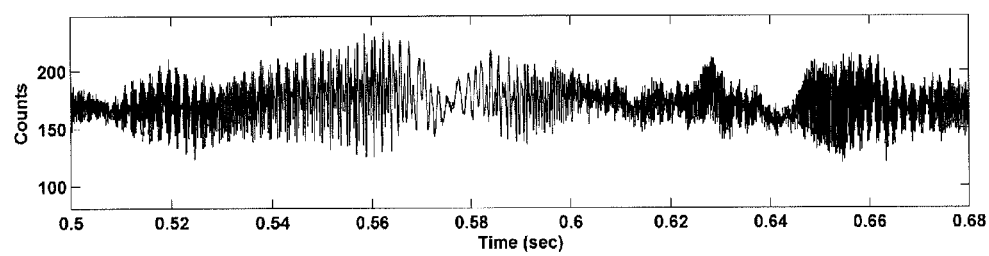
FIGS. 13a and 13b illustrate a plot of the time domain camera signal for a single pixel in an FMCW LADAR imaging system, according to one embodiment of the present invention.
Figure 13B:
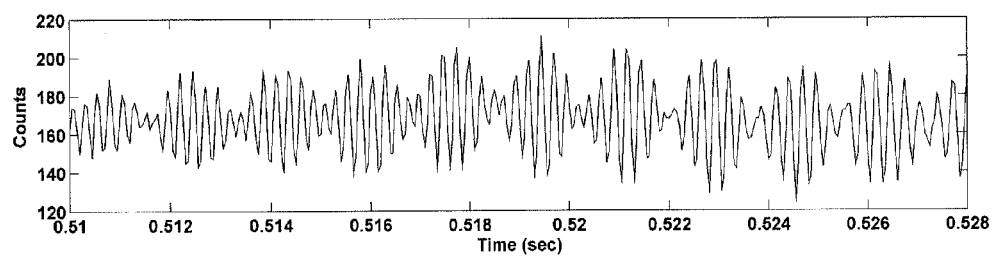

The foregoing processing steps may be more easily understood with reference to FIGS. 13a and 13b, which illustrate a plot of the time domain camera signal for a single pixel in an FMCW LADAR imaging system, according to one embodiment of the present invention. Shown in FIG. 13a is a 120 ms section of the data. A single tone amplitude envelope can be seen in the data for most of the duration shown. FIG. 13b expands the view near 0.52 seconds. Here the amplitude envelope can be clearly seen with a period of roughly 1.75 ms. This amplitude envelope is due to the beating of the pilot IF with the FMCW IF. Notice that the frequency of the amplitude envelope is constant while the frequency of the higher spectral component is changing.

This changing frequency is due to the varying Doppler shift and speckle decorrelation from target motion. Notice that the higher frequency component crosses zero near t=0.575 seconds. This corresponds to a point in time where the line of sight velocity of this point on the target had an extreme value. In other words, the velocity was negative before t=0.575 seconds and became positive afterward, or it was negative before and positive after.

Figure 14A:
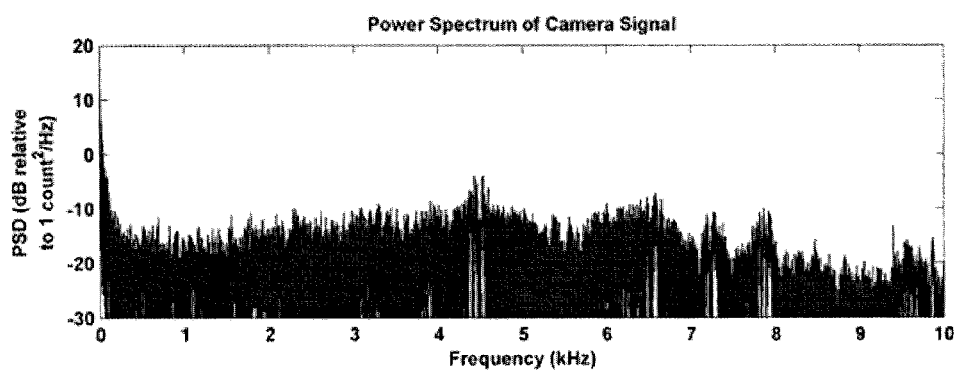
FIGS. 14a and 14b illustrate the power spectra of a camera signal and the square of the camera signal, in accordance with one aspect of the present invention.
Figure 14B:
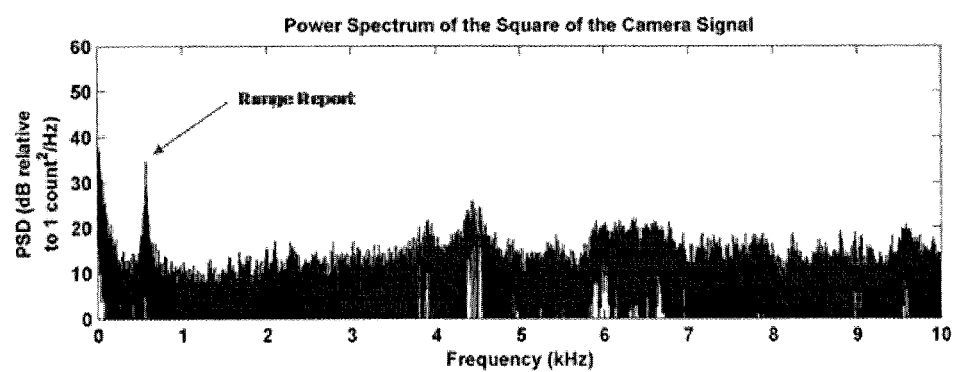

The operation of the motion compensation is illustrated by observing the power spectra of the camera signal and the square of the camera signal, shown in FIGS. 14a and 14b, in accordance with one aspect of the present invention. In the spectrum of the signal prior to squaring graphed in FIG. 14a, one can observe spectral content smeared out to 9 kHz. This means that target motion shifted the frequency of the light, and thus the frequencies of the pilot and FMCW IF signals, by +/−9 kHz. Thus, the target was moving +/−(9 kHz)(780 nm)/2=3.5 mm/s during the dwell time. If the target and platform were perfectly stationary, the spectrum at the top of the figure would show a sharp peak near 572 Hz. No peak is visible because target motion has smeared the signal out to 9 kHz. FIG. 14b shows the spectrum of the square of the signal. Squaring places energy in the constant frequency difference between the pilot IF and the FMCW IF. This spectrum shows a clearly identifiable peak at 572 Hz roughly 20 dB above the noise floor. Notice that this frequency is the reciprocal of the beat period observed above. Range in this pixel is computed from the location of the peak. The clear difference between the two power spectra plots illustrates the effect of the motion compensation in sharpening the smeared spectrum.

According to various embodiments of the present invention, differential IF detection may be performed with post-processing or with pre-processing. The post-processing method relies on the camera to digitize the wideband frequency modulated signal. Envelope detection is performed in post-processing by squaring the digital signal prior to computing the Fourier transform. The capability of the method is limited to low target velocities where the bandwidth of the signal is within the camera bandwidth, which is set by the frame rate. The pre-processing method performs the envelope detection electrically within the camera prior to analog to digital conversion. This method can compensate for much larger target motion since the bandwidth of the collected signal is not limited by the frame rate. Instead, it is only limited by the bandwidth of camera photodetector which will likely be 100's of MHz or more.

In accordance with one aspect of the present invention, a pre-processing FMCW LADAR imaging system is provided with a camera having a multiplier corresponding to each pixel thereof, located between the pixel and the digitizer. The multiplier translates the energy received at each pixel to a low-bandwidth IF difference. The multiplier may comprise, for example, a simple diode, suitably biased, placed between each photodetector and each corresponding photocurrent charge storage capacitor. This system is capable of handling much larger velocities (e.g. >500 m/s), and allows multiple targets with different velocities in the same field of view.

Figure 15:
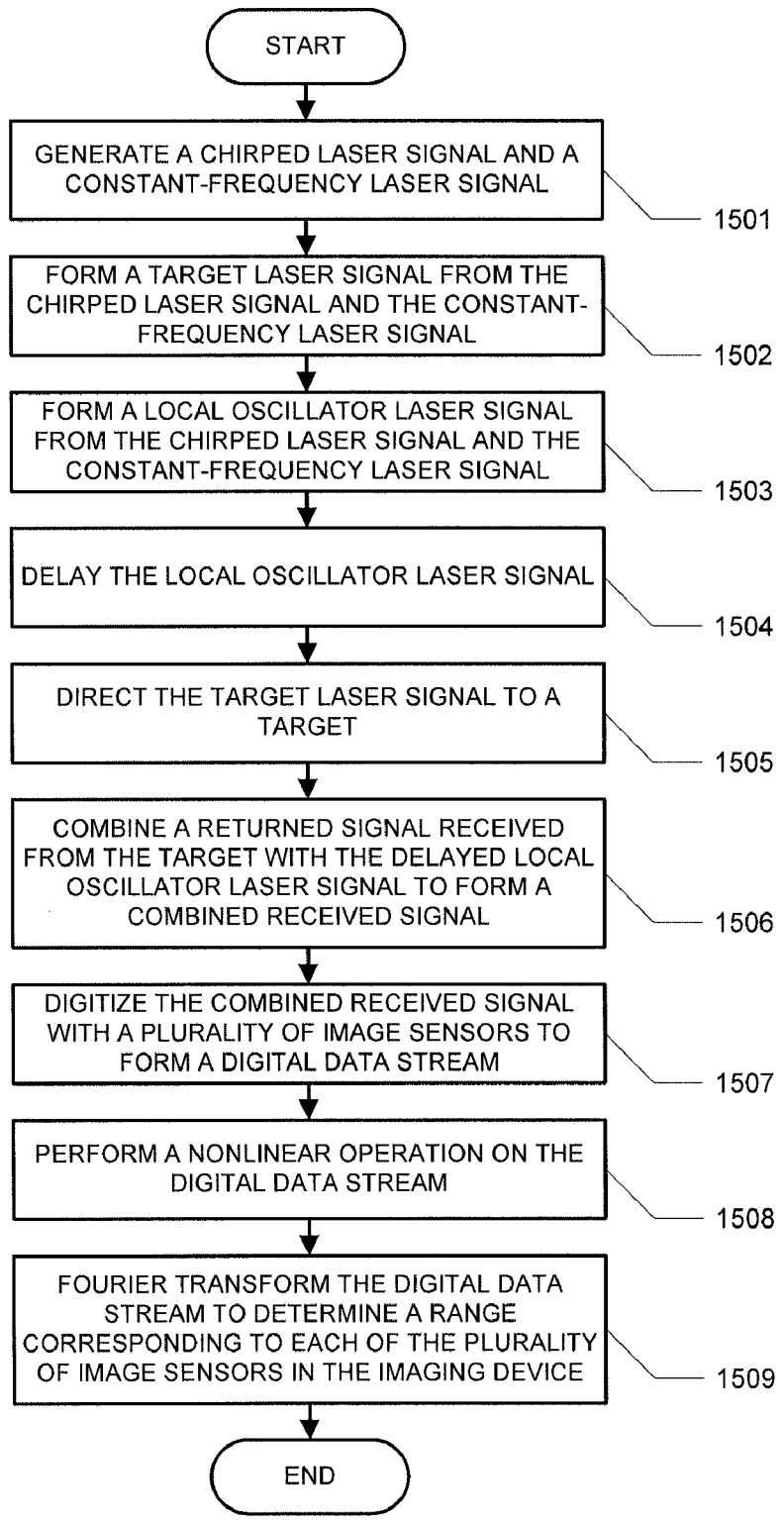
FIG. 15 is a flow chart illustrating a method for FMCW LADAR imaging, in accordance with one embodiment of the present invention.

FIG. 15 is a flow chart illustrating a method for FMCW LADAR imaging, in accordance with one embodiment of the present invention. The method begins in step 1501, in which first and second lasers generate a chirped laser signal and a constant-frequency laser signal, respectively. In step 1502, a target laser signal is formed from the chirped laser signal and the constant-frequency laser signal. A local oscillator laser signal is formed from the chirped laser signal and the constant-frequency laser signal in step 1503, and in step 1504, the local oscillator laser signal is delayed. In step 1505, the target laser signal is directed to a target, and in step 1506, the returned signal received from the target is combined with the delayed local oscillator laser signal to form a combined received signal. The combined received signal is digitized, in step 1507, with a plurality of image sensors to form a digital data stream. In step 1508, a nonlinear operation is performed on the digital data stream, and in step 1509, the digital data stream is Fourier transformed to determine a range corresponding to each of the plurality of image sensors in the imaging device.

For a body rotating in space, part of the target approaches the camera as the target rotates, while other parts recede. So the resulting heterodyne tones go both higher and lower in frequency than they otherwise would have, such that the total bandwidth needed to capture the entire image is increased, possibly exceeding the camera bandwidth. If the target is rigid, however, there will be some locus of pixels around the zero-velocity pixel(s) in which the resulting heterodyne tones are within the camera bandwidth (i.e., that will produce a signal that can contribute to an image), whereas pixels outside of this locus will be moving too rapidly and will not. In this case, if a shot noise penalty is paid, a multi-zone image can nevertheless be taken by illuminating the detector array with two or more copies of the LO beam, with different delays, or equivalently, with different frequency offsets. Each different LO added to the detector array contributes shot noise, but produces a different range-Doppler "zero," that can be placed at different parts of the target. In this context, a "zero" means a range-Doppler bin that produces a zero heterodyne frequency with the delayed LO beam.

For example, a three-LO beam can be arranged for a rotating airplane (having a rigid body), such that the cockpit, right wingtip, and left wingtip are each within three different zeros. Each one of these zeros will have its own locus of nearby pixels in which the resulting heterodyne signal is within the camera bandwidth. In this case, an accurate measurement of the aircraft's rate of turn may be made, because range-Doppler measurements are being made at widely-separated points on the craft. There might still be blind regions in between the zeros, (that is, the loci do not necessarily overlap) but this is not of consequence if rigidity is assumed, and may be made to overlap by employing more LO beams (with a shot noise penalty). In this case, the multiple LO chirps could be obtained by: multiple, selectable (more than one at a time) delay paths, or by a locus of parallel AOMs that added different frequency offsets to the beam, or by one or more phase modulators that each wrote sidebands at equally-spaced frequency intervals around the central frequency, or by a single-sideband optical modulator that received a locus of desired tones, e.g. made by an arbitrary waveform generator, corresponding to the desired offsets. This multi-frequency chirped LO would then be used to interfere with the light returning from the target.

Figure 16:
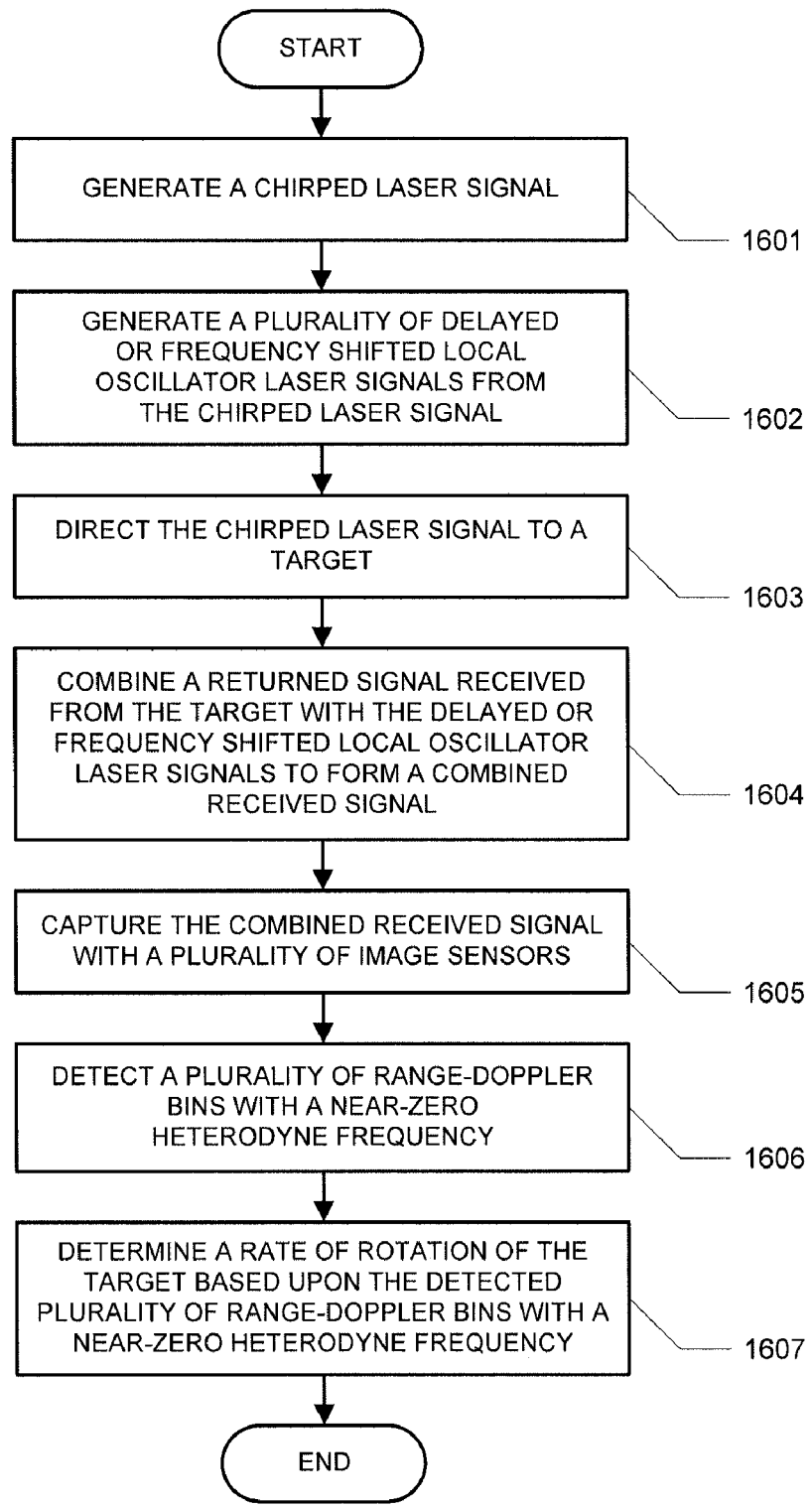
FIG. 16 is a flow chart illustrating a method for FMCW LADAR imaging, in accordance with one embodiment of the present invention.

FIG. 16 is a flow chart illustrating a method for FMCW LADAR imaging, in accordance with one embodiment of the present invention. The method begins in step 1601, in which a chirped laser signal is generated. In step 1602, a plurality of delayed or frequency shifted local oscillator laser signals are generated from the chirped laser signal. Each of the plurality of delayed or frequency shifted local oscillator laser signals is delayed or frequency shifted from the chirped laser signal by a different amount. In step 1603, the chirped laser signal is directed to a target. The returned signal received from the target is combined, in step 1604, with the delayed or frequency shifted local oscillator laser signals to form a combined received signal. In step 1605, the combined received signal is captured with a plurality of image sensors, and in step 1606, a plurality of range-Doppler bins with a near-zero heterodyne frequency are detected. Each of the plurality of range-Doppler bins corresponds to one of the plurality of delayed or frequency shifted local oscillator laser signals. In step 1607, a rate of rotation of the target is determined based upon the detected plurality of range-Doppler bins with a near-zero heterodyne frequency.

For a rigid body accelerating radially with respect to the observer, the problem is different, as acceleration leads to range smearing. Changing velocity during the chirp leads to a changing heterodyne frequency, which means that the simple Fourier transform will no longer place all the energy from a given return in the same range bin. In principle, this could be fixed by modeling the motion and correcting for it, such that the corrected data would then have a fixed heterodyne frequency, subject to Fourier transformation—but this method requires that the entire heterodyne waveform resides within the camera's Nyquist bandwidth. But that is not necessarily the case: for a camera with 1000 frames/second rate, the Nyquist bandwidth is 500 Hz, which corresponds to a target velocity of only 250 microns/second, assuming the broadcast wavelength is 1 micron. As will be readily apparent to those of skill in the art, little velocity is required to get a signal outside of such a camera's bandwidth. Accordingly, in one embodiment of the present invention, a method for keeping a signal within the camera bandwidth is provided, suitable for a rigid body with radial acceleration (e.g., an incoming missile or other munitions).

If the radial motion of the target at the location of one pixel can be accurately measured, and the broadcast chirp corrected to provide a single-frequency heterodyne return, then the rest of the image can be collected with the same corrected-chirp waveform, and processed to provide range data as well. This method also works with targets with non-constant accelerated motion, for example, if the target were sinusoidally moving towards and away from the camera, with constantly changing velocity, during the entire acquisition.

The foregoing analysis assumed that no correction was made to the signals. A simple FT is performed on the time series, and pixels not at the same range as the standard pixel appear to blur by the fractional amount the standard pixel moves relative to the LO delay. In this case, the system would be modified by having a higher-powered, single-pixel sensor beam placed within the field of view of the array. That beam would have sufficient power to obtain range/velocity estimates at good SNR many times during the array's slow chirp collection. As the target moved during the array's acquisition, the motion would be recorded by the sensor beam, and this information would be used to alter the broadcast chirp, such that resulting distorted chirp would give, with the delay of the range-varying target, a delayed self-heterodyne that nevertheless presented a clean, single-frequency sinusoidal interference tone, suitable for Fourier transforming into one single range bin. Effectively, the pre-distortion of the chirp would exactly cancel the target's corrupting Doppler shift, affording the clean self-heterodyne tone.

For example, in accordance with one embodiment of the present invention, the linear FMCW LADAR apparatus described above is modified by merging a lower-divergence beam of higher power (a "sensor beam") with the array's broadcast beam, and by providing a single-pixel receiver, with higher bandwidth, observing the sensor beam. The sensor beam may be, e.g., polarized differently, to distinguish it from the array beam. The self-heterodyne arising from the sensor beam can then be used, instead of the internal delayed self-heterodyne interferometer, to phase-lock the chirp. As the target moves, the chirp rate is altered such that the delayed self-heterodyne coming from the sensor beam remained at a constant frequency, with smooth phase evolution. In this case, the pixel within the array looking at the same point on the target as the sensor beam, would obtain a clean, sinusoidal heterodyne tone irrespective of target motion. Neighboring pixels, at different ranges, would not obtain the perfect result of the sensor's pixel because the delay would be slightly wrong, but a large part of the error would nevertheless be removed. Accordingly, a large part of the signal's bandwidth, including bandwidth that could have exceeded the array camera's bandwidth, would be collapsed by this method, to the extent that other pixels share the same radial acceleration that the sensor-pixel experiences.

Figure 17:
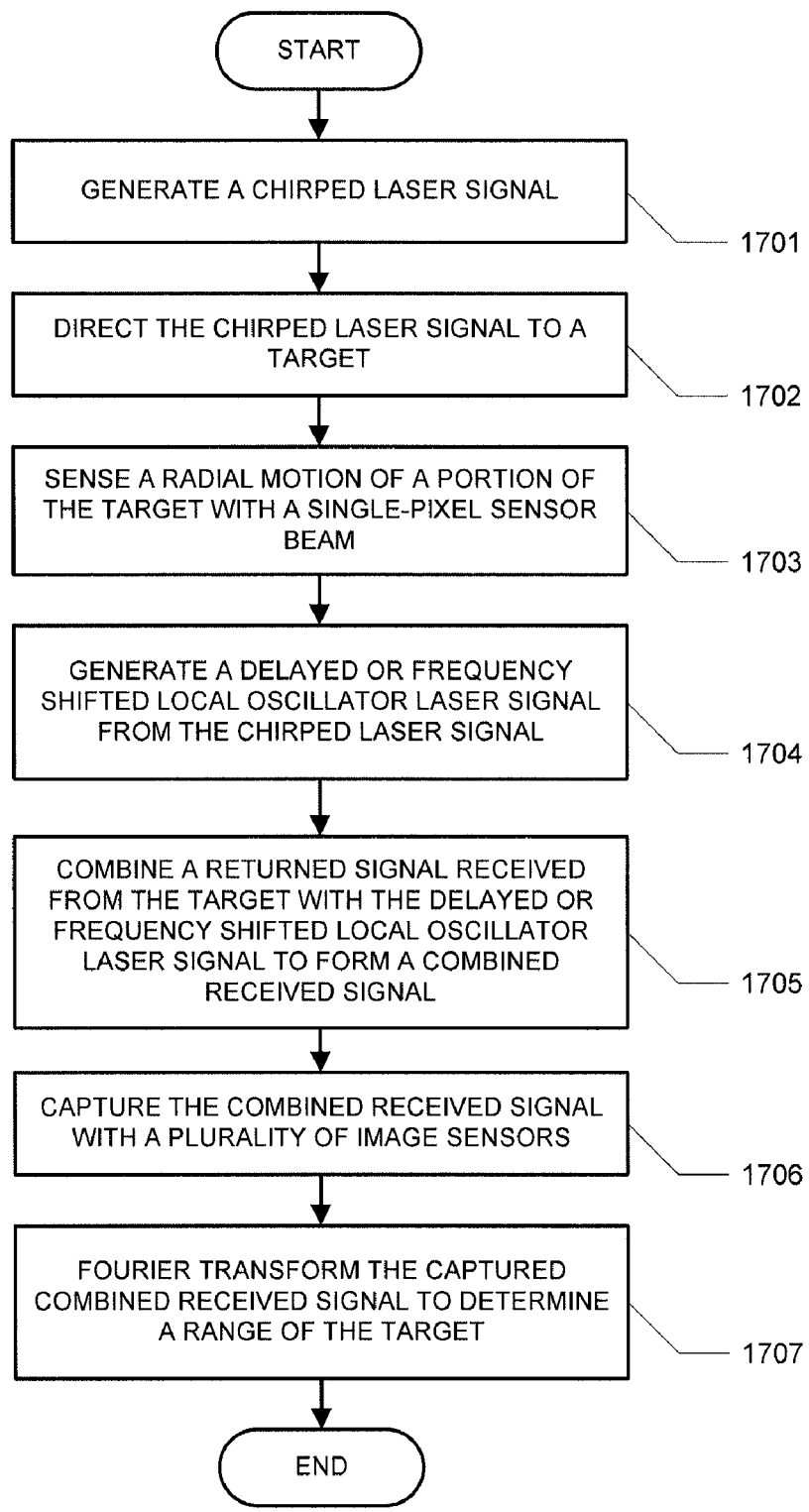
FIG. 17 is a flow chart illustrating a method for FMCW LADAR imaging, in accordance with one embodiment of the present invention.

FIG. 17 is a flow chart illustrating a method for FMCW LADAR imaging, in accordance with one embodiment of the present invention. The method begins in step 1701, in which a chirped laser signal is generated, and continues in step 1702, in which the chirped laser signal is directed to a target. In step 1703, a single-pixel sensor beam is used to sense a radial motion of a portion of the target. A delayed or frequency shifted local oscillator laser signal is generated from the chirped laser signal in step 1704. The amount by which the local oscillator laser signal is delayed or frequency shifted is determined based upon the sensed radial motion. In step 1705, a returned signal received from the target is combined with the delayed or frequency shifted local oscillator laser signal to form a combined received signal, and in step 1706, the combined received signal is captured with a plurality of image sensors. In step 1707, the captured combined received signal is Fourier transformed to determine a range of the target.

While the foregoing methods are suitable for scenarios in which rigid bodies either rotate with fixed rotational velocity or accelerate radially towards or away from the observer, they are incapable of accommodating non-rigid bodies, or operating outside of these particular scenarios. Accordingly, to address these scenarios, a micro motion compensation system is provided that, in accordance with various aspects of the present invention, corrects and removes the effects of a time varying Doppler shift and speckle decorrelation for targets that may be non-rigid and may move or accelerate in any dimension. The system transmits a single frequency optical pilot tone and a FMCW signal simultaneously. Any Doppler or speckle induced phase or frequency modulation will be identical on both the pilot tone and the FMCW, and thus these effects can be removed. This correction will occur on each pixel individually, allowing the target to have independent motion at different cross range locations.

Figure 18:
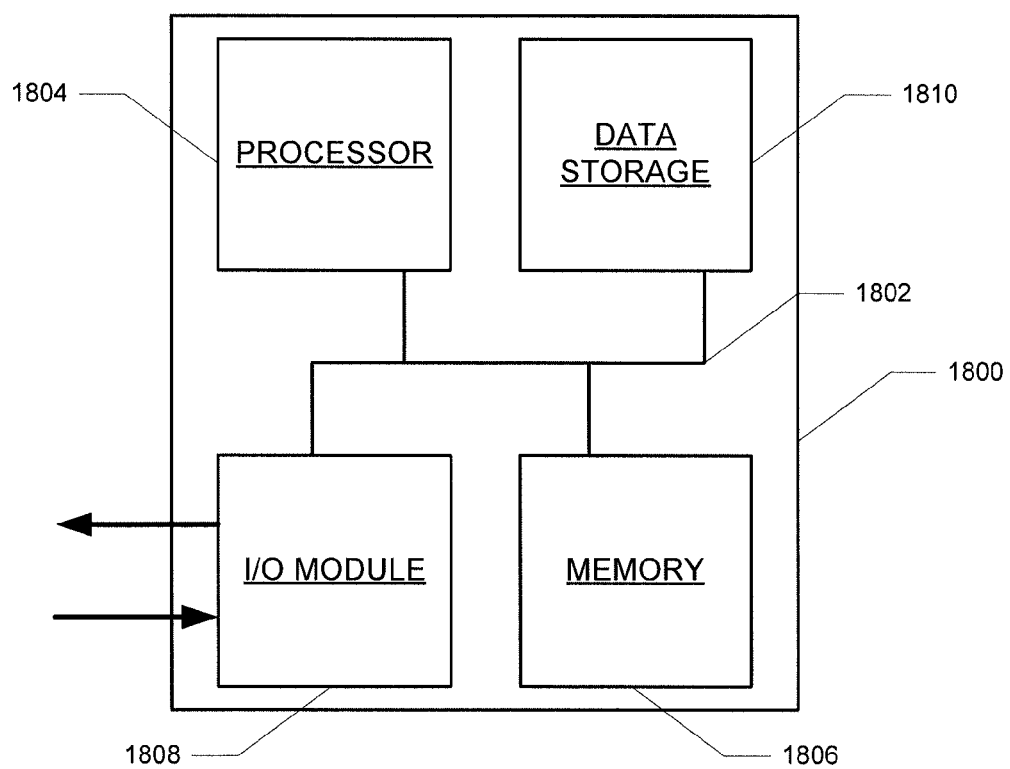
FIG. 18 is a block diagram that illustrates a computer system upon which an embodiment of the present invention may be implemented.

FIG. 18 is a block diagram that illustrates a computer system 1800 upon which an embodiment of the present invention may be implemented. Computer system 1800 includes a bus 1802 or other communication mechanism for communicating information, and a processor 1804 coupled with bus 1802 for processing information. Computer system 1800 also includes a memory 1806, such as a random access memory ("RAM") or other dynamic storage device, coupled to bus 1802 for storing information and instructions to be executed by processor 1804. Memory 1806 may also be used for storing temporary variables or other intermediate information during execution of instructions by processor 1804. Computer system 1800 further includes a data storage device 1810, such as a magnetic disk or optical disk, coupled to bus 1802 for storing information and instructions.

Computer system 1800 may be coupled via I/O module 1808 to a display device (not illustrated), such as a cathode ray tube ("CRT") or liquid crystal display ("LCD") for displaying information to a computer user. An input device, such as, for example, a keyboard or a mouse may also be coupled to computer system 1800 via I/O module 1808 for communicating information and command selections to processor 1804.

According to one embodiment of the present invention, FMCW LADAR imaging is performed by a computer system 1800 in response to processor 1804 executing one or more sequences of one or more instructions contained in memory 1806. Such instructions may be read into memory 1806 from another machine-readable medium, such as data storage device 1810. Execution of the sequences of instructions contained in main memory 1806 causes processor 1804 to perform the process steps described herein. One or more processors in a multi-processing arrangement may also be employed to execute the sequences of instructions contained in memory 1806. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 1804 for execution. Such a medium may take many forms, including, but not limited to, non-volatile media, volatile media, and transmission media. Non-volatile media include, for example, optical or magnetic disks, such as data storage device 1810. Volatile media include dynamic memory, such as memory 1806. Transmission media include coaxial cables, copper wire, and fiber optics, including the wires that comprise bus 1802. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for frequency modulated continuous wave LADAR imaging, comprising the steps of:
    generating a chirped laser signal and a constant-frequency laser signal;
    combining the chirped laser signal and the constant-frequency laser signal to form a target laser signal;
    combining the chirped laser signal and the constant-frequency laser signal to form a local oscillator signal;
    delaying or frequency shifting the local oscillator laser signal;
    directing the target laser signal to a target;
    combining a returned signal received from the target with the delayed or frequency shifted local oscillator laser signal to form a combined received signal;
    capturing the combined received signal with a plurality of image sensors;
    performing a nonlinear operation on the captured combined received signal; and
    Fourier transforming the captured combined received signal to determine a range corresponding to each of the plurality of image sensors in the imaging device.

2. The method according to claim 1, further comprising generating the chirped laser signal and the constant-frequency laser signal with first and second external cavity diode lasers, respectively.

3. The method according to claim 1, wherein the nonlinear operation comprises squaring a photocurrent signal captured at each of the plurality of image sensors.

4. The method according to claim 1, wherein the nonlinear operation is performed separately on digital data derived from each of the plurality of image sensors.

5. The method according to claim 1, wherein a frequency of the constant-frequency laser signal is outside a frequency range of the chirped laser signal.

6. The method according to claim 1, wherein the chirped laser signal is configured with a linear chirp.

7. A frequency modulated continuous wave LADAR imaging system, comprising:
- a first laser configured to generate a chirped laser signal;
- a second laser configured to generate a constant-frequency laser signal;
- divider optics configured to combine the chirped laser signal and the constant-frequency laser signal to form chirped and constant-frequency local oscillator signals;
- optics configured to delay or frequency shift the chirped and constant-frequency local oscillator laser signals;
- targeting optics configured to direct the chirped laser signal and the constant-frequency laser signal to a target;
- receiving optics configured to combine a returned signal received from the target with the delayed or frequency shifted chirped and constant-frequency local oscillator laser signals to form a combined received signal;
- an imaging sensor array configured to capture the combined received signal with a plurality of sensors;
- circuitry configured to perform a nonlinear operation on the captured combined received signal; and
- a processor configured to Fourier transform the captured combined received signal to determine a range corresponding to each of the plurality of pixels in the imaging device.

8. The system according to claim 7, wherein the first and second lasers are external cavity diode lasers.

9. The system according to claim 7, wherein the optics configured to delay or frequency shift the chirped and constant-frequency local oscillator laser signals comprise one or more lengths of optical fiber.

10. The system according to claim 7, wherein the optics configured to delay or frequency shift the chirped and constant-frequency local oscillator laser signals comprise an acousto-optical or electro-optical modulator.

11. The system according to claim 7, wherein the circuitry configured to perform the nonlinear operation comprises a plurality of diodes operably coupled to the plurality of sensors.

12. The system according to claim 7, wherein the processor comprises the circuitry configured to perform the nonlinear operation.

13. The system according to claim 7, wherein the nonlinear operation is squaring.

14. The system according to claim 7, wherein a frequency of the constant-frequency laser signal is outside a frequency range of the chirped laser signal.

15. The system according to claim 7, wherein the chirped laser signal is configured with a linear chirp.

* * * * *

UNITED STATES PATENT AND TRADEMARK OFFICE
CERTIFICATE OF CORRECTION

PATENT NO. : 7,986,397 B1
APPLICATION NO. : 12/113126
DATED : July 26, 2011
INVENTOR(S) : Bruce G. Tiemann et al.

It is certified that error appears in the above-identified patent and that said Letters Patent is hereby corrected as shown below:

Column 12, Line 32: Replace "$\tilde{U}_{xa}^{(1)}(x,y,t) = \sqrt{2z_m I_{xa}^{(1)}(x,y,t)} \exp\left[2\pi i\left(f_1 t + \frac{B}{t_r}t^2\right)\right]$" with -- $\tilde{U}_{xa}^{(1)}(x,y,t) = \sqrt{2z_m I_{xa}^{(1)}(x,y,t)} \exp\left[2\pi i\left(f_1 t + \frac{B}{2t_r}t^2\right)\right]$ --

Column 12, Line 38: Replace "$u_{xa}^{(1)}(x,y,t) = \frac{1}{\sqrt{2z_m}} \tilde{U}_{xa}^{(1)}(x,y,t) = \sqrt{I_{xa}^{(1)}(x,y,t)} \exp\left[2\pi i\left(f_1 t + \frac{B}{t_r}t^2\right)\right]$", with -- $u_{xa}^{(1)}(x,y,t) = \frac{1}{\sqrt{2z_m}} \tilde{U}_{xa}^{(1)}(x,y,t) = \sqrt{I_{xa}^{(1)}(x,y,t)} \exp\left[2\pi i\left(f_1 t + \frac{B}{2t_r}t^2\right)\right]$ --

Column 13, Line 37: Replace "$u_{sd}^{(2)}(x,y,t) = \sqrt{I_{sd}^{(2)}(x,y,t)} \exp\left[2\pi i f_{xp}\left[t - \frac{2R(T)}{c}\right] + i\varphi(t)\right]$,"

with -- $u_{sd}^{(2)}(x,y,t) = \sqrt{I_{sd}^{(2)}(x,y,t)} \exp\left[2\pi i f_{xp}\left(t - \frac{2R(T)}{c}\right) + i\phi(t)\right]$ --

Column 14, Line 1: Replace "$I(x,y,t) = |u_{sd}^{(1)}(x,y,t) + u_{od}^{(1)}(x,y,t) + u_{sd}^{(2)}(x,y,t) + u_{od}^{(2)}(x,y,t)$," with -- $I(x,y,t) = |u_{sd}^{(1)}(x,y,t) + u_{od}^{(1)}(x,y,t) + u_{sd}^{(2)}(x,y,t) + u_{od}^{(2)}(x,y,t)|$ --

Column 14, Line 23-25: Replace "$2\sqrt{I_{sd}^{(1)}(x,y,t)I_{od}^{(2)}(x,y,t)} \cos\left[2\pi\left(\frac{2R(T)}{\lambda_1} - f_1 t + f_{op} t - \frac{2BR^2(T)}{c^2 t_r} + \frac{2BR(T)}{c t_r} - \frac{Bt^2}{2t_r}\right) - \varphi(t)\right]+$,"

with -- $2\sqrt{I_{sd}^{(1)}(x,y,t)I_{od}^{(2)}(x,y,t)} \cos\left[2\pi\left(\frac{2R(T)}{\lambda_1} - f_1 t + f_{op} t - \frac{2BR^2(T)}{c^2 t_r} + \frac{2BR(T)t}{c t_r} - \frac{Bt^2}{2t_r}\right) - \varphi(t)\right]+$ --

Signed and Sealed this
Tenth Day of January, 2012

David J. Kappos
*Director of the United States Patent and Trademark Office*